United States Patent
Hyodo

(10) Patent No.: US 9,735,626 B2
(45) Date of Patent: Aug. 15, 2017

(54) NON-CONTACT POWER SUPPLY SYSTEM, NON-CONTACT POWER SUPPLY DEVICE, AND POWER SUPPLY TARGET DEVICE

(71) Applicant: Panasonic Intellectual Property Management Co., Ltd., Osaka (JP)

(72) Inventor: Satoshi Hyodo, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 411 days.

(21) Appl. No.: 14/400,184

(22) PCT Filed: Mar. 4, 2013

(86) PCT No.: PCT/JP2013/001299
§ 371 (c)(1),
(2) Date: Nov. 10, 2014

(87) PCT Pub. No.: WO2013/171943
PCT Pub. Date: Nov. 21, 2013

(65) Prior Publication Data
US 2015/0097440 A1   Apr. 9, 2015

(30) Foreign Application Priority Data
May 18, 2012   (JP) ................................ 2012-114402

(51) Int. Cl.
*H02J 17/00* (2006.01)
*H02J 5/00* (2016.01)
*H01F 38/14* (2006.01)

(52) U.S. Cl.
CPC .............. *H02J 17/00* (2013.01); *H01F 38/14* (2013.01); *H02J 5/005* (2013.01)

(58) Field of Classification Search
CPC ............ H01F 38/14; H02J 17/00; H02J 5/005
See application file for complete search history.

(56) References Cited

U.S. PATENT DOCUMENTS

| 2005/0068009 A1 | 3/2005 | Aoki |
| 2007/0139000 A1 | 6/2007 | Kozuma et al. |

(Continued)

FOREIGN PATENT DOCUMENTS

| CN | 101950999 A | 1/2011 |
| JP | 2005-110399 A | 4/2005 |

(Continued)

OTHER PUBLICATIONS

Wang Lu et al., "The Engineering Design of Contactless Emergency Power Supply in Maglev"; Proceedings of the CSEE, vol. 27, No. 18, Jun. 2007 (with English Abstract).

(Continued)

*Primary Examiner* — Rexford Barnie
*Assistant Examiner* — Elim Ortiz
(74) *Attorney, Agent, or Firm* — Renner, Otto, Boisselle & Sklar, LLP

(57) ABSTRACT

With a non-contact power supply system, a non-contact power supply device, and power supply target device of the present invention, power is supplied from a power supply coil of the non-contact power supply device to a power receiving coil of the power supply target device by non-contact power supply utilizing magnetic interaction. During the non-contact power supply, first, a power supply coil exhibiting a first interaction stronger than a predetermined reference interaction is selected as a candidate excitation coil, and a high-frequency voltage is supplied to the power supply coil of the candidate excitation coil. Second, a power supply coil exhibiting a second interaction weaker than the reference interaction and power supply coils adjacent to this power supply coil are selected as candidate excitation coils, and the high-frequency voltage is supplied to the power supply coils of these candidate excitation coils.

10 Claims, 13 Drawing Sheets

(56) References Cited

U.S. PATENT DOCUMENTS

| | | | |
|---|---|---|---|
| 2009/0033280 A1 | 2/2009 | Choi et al. | |
| 2009/0096413 A1* | 4/2009 | Partovi | H01F 5/003 320/108 |
| 2010/0225172 A1 | 9/2010 | Kozuma et al. | |
| 2011/0260532 A1 | 10/2011 | Tanabe | |
| 2012/0007437 A1* | 1/2012 | Fells | H01F 38/14 307/104 |
| 2012/0175983 A1* | 7/2012 | Rink | F16C 41/004 310/90 |
| 2012/0256585 A1* | 10/2012 | Partovi | H01F 5/003 320/108 |
| 2012/0274151 A1 | 11/2012 | Kozuma et al. | |
| 2013/0015705 A1 | 1/2013 | Abe | |
| 2013/0241288 A1 | 9/2013 | Kozuma et al. | |
| 2014/0042824 A1* | 2/2014 | Fells | H01F 38/14 307/104 |

FOREIGN PATENT DOCUMENTS

| | | |
|---|---|---|
| JP | 2006-149168 A | 6/2006 |
| JP | 2006-246633 A | 9/2006 |
| JP | 4089778 B | 3/2008 |
| JP | 2009-525715 A | 7/2009 |
| JP | 2009-201328 A | 9/2009 |
| JP | 2010-288442 A | 12/2010 |
| JP | 2011-211874 A | 10/2011 |
| WO | WO 2008/137996 A1 | 11/2008 |
| WO | WO 2009/027674 A1 | 3/2009 |
| WO | WO 2009/047768 A2 | 4/2009 |

OTHER PUBLICATIONS

Sun Lu-mei et al.; "Design of radio monitoring system for water level using power supplied by solar energy", Electric Power, vol. 39, No. 9, Sep. 2006 (with English Abstract).

Extended European Search Report for corresponding European Application No. 13791010.5 dated May 6, 2015.

International Search Report for corresponding International Application No. PCT/JP2013/001299 mailed May 7, 2013.

* cited by examiner

FIG. 12
A.
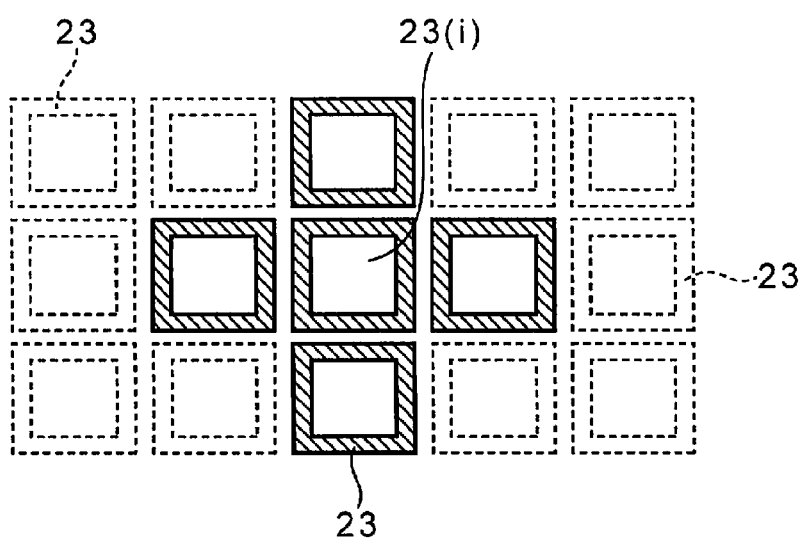
B.
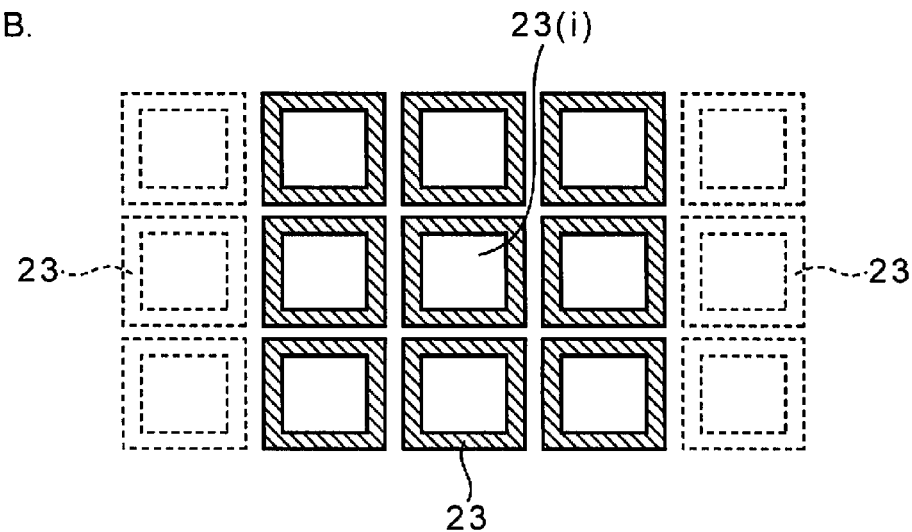

NON-CONTACT POWER SUPPLY SYSTEM, NON-CONTACT POWER SUPPLY DEVICE, AND POWER SUPPLY TARGET DEVICE

TECHNICAL FIELD

The present invention relates to a non-contact power supply system for supplying electric power from a power supply coil of a non-contact power supply device to a power receiving coil of a power supply receiving device by utilizing an electromagnetic induction phenomenon. The present invention also relates to a non-contact power supply device and a power supply target device (power supply receiving device) of the non-contact power supply system.

BACKGROUND ART

Conventional non-contact power supply systems are known in the art, which supply electric power from a power supply coil of a non-contact power supply device to a power receiving coil of a power supply receiving device by utilizing an electromagnetic induction phenomenon. Such non-contact power supply systems are inconvenient because the power supply coil and the power receiving coil need to be positioned with each other.

In view of this, a technique disclosed in Patent Literature 1 is known in the art, for example. According to the technique disclosed in Patent Literature 1, a plurality of power supply coils of the power supply device are arranged in a matrix pattern. Then, the position of the power supply receiving device is detected, and a power supply coil located facing the power supply receiving device is driven to supply power to the power supply receiving device.

Therefore, a user can simply place the power supply receiving device over the power supply device, without accurately positioning the power supply coil and the power receiving coil with each other, to enable non-contact power supply from a power supply coil located facing the power receiving coil of the power supply receiving device.

In order to enable power supply only for particular power supply receiving devices, techniques have also been known in the art in which the power supply receiving device transmits an authentication signal to the power supply device so that power supply is enabled only when the authentication succeeds (see, for example, Patent Literature 2).

However, with the technique disclosed in Patent Literature 2, the power supply receiving device needs to transmit an authentication signal to the power supply device in order to authenticate the power supply receiving device. Moreover, required electric power, which is electric power needed for the power supply receiving device to operate to transmit the authentication signal to the power supply device, needs to be supplied from the power supply device to the power supply receiving device.

On the other hand, where power supply coils are arranged in a matrix pattern, and one of the power supply coils located facing the power receiving coil of the power supply receiving device (power supply target device) is selected and driven, as in the technique disclosed in Patent Literature 1, the position of the selected power supply coil and the position of the power receiving coil may be misaligned with each other. When the position of the power supply coil and the position of the power receiving coil are misaligned with each other, the electric power to be supplied from the power supply device to the power supply receiving device decreases. Therefore, the electric power supplied from the power supply device to the power supply receiving device becomes less than the required electric power. As a result, the power supply receiving device may possibly fail to transmit an authentication signal to the power supply device, thereby failing the authentication.

CITATION LIST

Patent Literature

Patent Literature 1: Japanese Unexamined Patent Publication No. 2006-149168
Patent Literature 2: Japanese Unexamined Patent Publication No. 2011-211874

SUMMARY OF INVENTION

The present invention has been made in view of the above, and an object of the present invention is to provide a non-contact power supply system, a non-contact power supply device, and a power supply receiving device, with which it is possible to reduce the decrease in electric power to be supplied from the non-contact power supply device to the power supply receiving device even if there is a positional misalignment between the power supply coil and the power receiving coil.

With a non-contact power supply system, a non-contact power supply device and a power supply receiving device of the present invention, power is supplied from the power supply coil of the non-contact power supply device to the power receiving coil of the power supply receiving device through non-contact power supply utilizing magnetic interaction. During the non-contact power supply, first, a power supply coil exhibiting a first interaction stronger than a predetermined reference interaction is selected as a candidate excitation coil, and a high-frequency voltage is supplied to the power supply coil of the candidate excitation coil. Second, a power supply coil exhibiting a second interaction weaker than the reference interaction and power supply coils adjacent to this power supply coil are selected as candidate excitation coils, and the high-frequency voltage is supplied to the power supply coils of these candidate excitation coils. Therefore, with such a non-contact power supply system, a non-contact power supply device and a power supply receiving device, it is possible to reduce the decrease in electric power to be supplied to the power supply receiving device from the non-contact power supply device even if there is a positional misalignment between the power supply coil and the power receiving coil.

This and other objects, features and advantages of the present invention will become more apparent from the following detailed description and the accompanying drawings.

BRIEF DESCRIPTION OF DRAWINGS

FIG. 12 A diagram illustrating power supply coils to be candidate excitation coils in the non-contact power supply system shown in FIG. 1.

DESCRIPTION OF EMBODIMENTS

An embodiment of the present invention will now be described with reference to the drawings. Note that the same reference sign is assigned to the same element throughout different figures, and the description of the same element may be omitted when appropriate. In the present specification, reference signs with suffixes are used to collectively refer to elements, and reference signs with no suffix are used to refer to individual elements.

Figure 1:
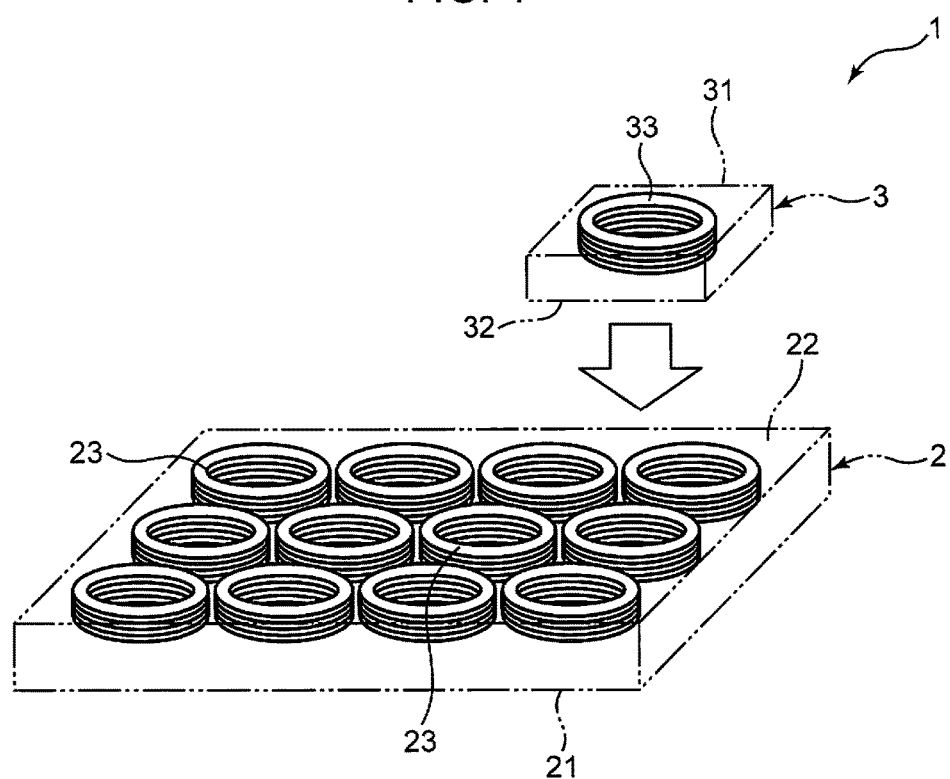
FIG. 1 A diagram illustrating an example configuration of a non-contact power supply system according to an embodiment of the present invention.

FIG. 1 is a diagram illustrating an example configuration of a non-contact power supply system according to an embodiment of the present invention. A non-contact power supply system 1 shown in FIG. 1 includes a non-contact power supply device 2 and a power supply receiving device (power supply target device) 3, which are used in combination with each other. The non-contact power supply device 2 and the power supply receiving device 3 can be separated from each other.

The non-contact power supply device 2 includes a generally box-shaped casing 21, and the power supply receiving device 3 includes a generally box-shaped casing 31. In FIG. 1, the upper surface of the casing 21 of the non-contact power supply device 2 is used as a loading surface (first opposing surface) 22, on which the power supply receiving device 3 is placed. The portion forming the upper surface of the casing 21 is an example of a loading member. The lower surface of the casing 31 of the power supply receiving device 3 is used as a contact surface (second opposing surface) 32, which faces, and is brought into contact with, the loading surface 22. In the example shown in FIG. 1, the casing 21 of the non-contact power supply device 2 is larger than the casing 31 of the power supply receiving device 3, and the loading surface 22 is larger than the contact surface.

The non-contact power supply device 2 includes a plurality (n) of power supply coils 23 arranged in a two-dimensional array pattern on the inside of (immediately below) the loading surface 22 (inside the casing 21) so that the upper surfaces of the coils lie generally parallel to and along the loading surface 22. The power supply coils 23 are arranged closely together so that the interval between the power supply coils 23 is generally zero. That is, the power supply coils 23 are arranged so that the coil circumferential surfaces are in contact with one another.

For the purpose of discussion, the n power supply coils 23 are assigned coil numbers from 1 to n. Hereinafter, a power supply coil 23, the coil number of which is i will be referred to as the power supply coil 23($i$).

The power supply receiving device 3 includes a power receiving coil 33 arranged on the inside of (immediately above) the contact surface 32 (inside the casing 31) so that the upper surface of the coil lies generally parallel to and along the contact surface 32. The power receiving coil 33 is an object to which power is supplied from the power supply coils 23 through the electromagnetic induction phenomenon. Then, the electric power received by the power receiving coil 33 is supplied to a presence notification section and a load to be described later.

Figure 2:
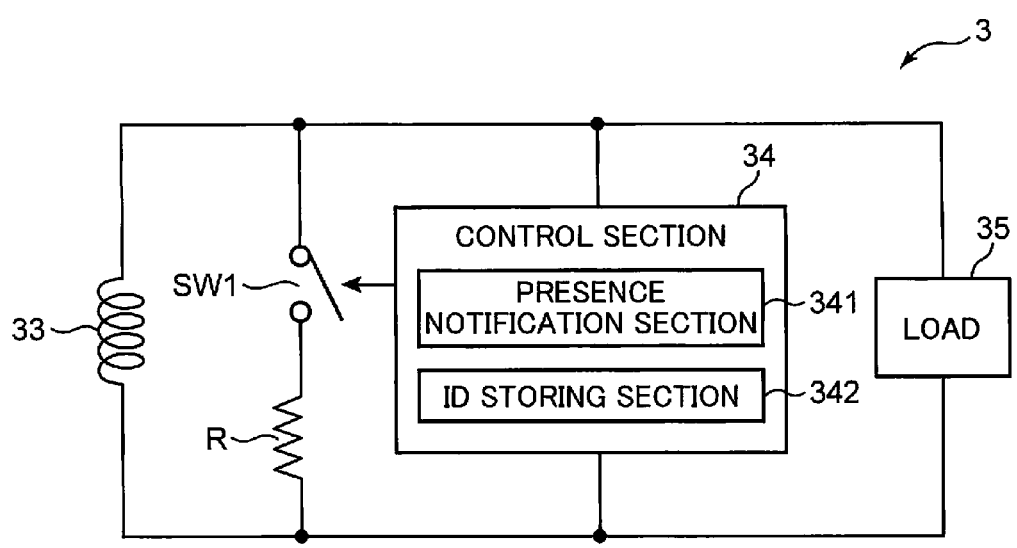
FIG. 2 A block diagram showing an example electrical configuration of a power supply receiving device in the non-contact power supply system shown in FIG. 1.

FIG. 2 is a block diagram showing an example electrical configuration of the power supply receiving device 3 in the non-contact power supply system 1 shown in FIG. 1. The power supply receiving device 3 includes, for example, the power receiving coil 33, a control section 34, a load 35, a switching element SW1, and a resistor R, as shown in FIG. 2.

The control section 34 includes a CPU (Central Processing Unit) for executing predetermined arithmetic operations, for example, a ROM (Read Only Memory) storing predetermined control programs therein, a RAM (Random Access Memory) for temporarily storing data, a rewritable non-volatile ID storing section 342 such as an EEPROM (Electrically Erasable and Programmable Read Only Memory), for example, a timer circuit, and peripheral circuits, or the like.

The control section 34 executes a control program stored in the ROM, for example, thereby implementing, function-wise, a presence notification section 341, and thus serving as such. The ID storing section 342 stores therein identification information (ID), which is an identifier for identifying and specifying the power supply receiving device 3. The control section 34 operates by the electric power supplied from the power receiving coil 33.

The switching element SW1 is connected in series with the resistor R. Then, the series circuit of the switching element SW1 and the resistor R is connected in parallel to the power receiving coil 33. The switching element SW1 is turned ON/OFF according to a control signal from the presence notification section 341.

The presence notification section 341 changes the impedance of the power receiving coil 33 by turning ON/OFF the switching element SW1. As the impedance of the power receiving coil 33 changes, the interaction between the power receiving coil 33 and the power supply coils 23 changes. As a result, the coil current I flowing through the power supply coils 23 changes depending on the ON/OFF of the switching element SW1. The presence notification section 341 turns the switching element SW1 ON and OFF according to the identification information stored in the ID storing section 342, thereby transmitting the identification information of itself, as the presence notification, to the power supply device 2.

The load 35 is a load circuit operating by the electric power supplied from the power receiving coil 33. The load 35 is connected in parallel to the power receiving coil 33.

Figure 3:
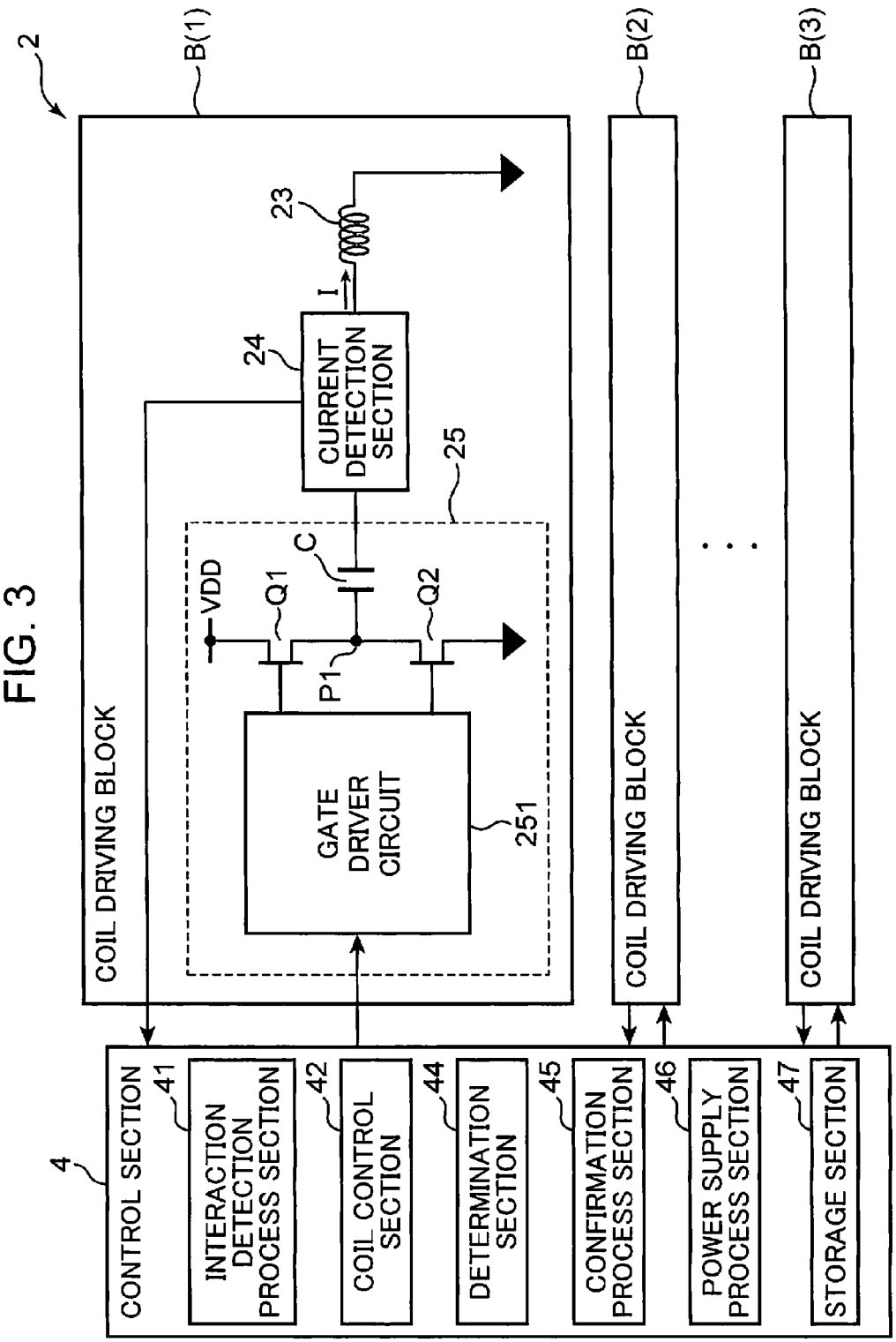
FIG. 3 A block diagram showing an example electrical configuration of a non-contact power supply device in the non-contact power supply system shown in FIG. 1.

FIG. 3 is a block diagram showing an example electrical configuration of the non-contact power supply device 2 in the non-contact power supply system 1 shown in FIG. 1. The non-contact power supply device 2 includes, for example, a plurality of coil driving blocks B and a control section 4 as shown in FIG. 3. A coil driving block B includes a power supply coil 23, and a plurality of coil driving blocks B are provided so as to correspond respectively to a plurality of power supply coils 23.

A coil driving block B includes a power supply coil 23, a current detection section 24, and a power source section 25. The power source section 25 is a circuit for supplying a high-frequency voltage selectively to power supply coils 23, and includes a gate driver circuit 251, FETs (Field Effect Transistors) Q1 and Q2, and a capacitor C, for example.

The FET Q1 is a P-channel FET, for example, and the FET Q2 is an N-channel FET, for example. Then, a power source voltage VDD supplied from a power source circuit (not shown) is applied to the source of the FET Q1, with the drain of the FET Q1 connected to the drain of the FET Q2, and the source of the FET Q2 connected to the circuit ground. A node P1 between the FET Q1 and the FET Q2 is connected to the circuit ground via the capacitor C, the current detection section 24 and the power supply coil 23.

According to a control signal from the control section 4, the gate driver circuit 251 turn ON/OFF the FET Q1 and the FET Q2 generally alternately with a high frequency so that one is turned ON while the other is turned OFF. Thus, a high-frequency voltage is generated at the node P1 by the FETs Q1 and Q2. The capacitor C cuts off the direct-current component from the high-frequency voltage generated by the FETs Q1 and Q2, thereby supplying the remaining high-frequency component to the power supply coil 23.

The current detection section 24 detects a coil current I flowing through the power supply coil 23 based on the high-frequency voltage supplied from the power source section 25. Then, the current detection section 24 outputs a signal representing the current value of the detected coil current I to the control section 4. The current detection section 24 is a current sensor such as a shunt resistor or a Hall element, for example.

The coil current I changes as it is influenced by the intensity of the magnetic interaction between the power supply coil 23 and the power receiving coil 33. Therefore, the coil current I is an example of the interaction information representing the intensity of the magnetic interaction between the power supply coil 23 and the power receiving coil 33, and the current detection section 24 is an example of the interaction detection section.

The presence notification is represented by the change of the coil current I, as described above, and the coil current I is therefore an example of information representing the presence notification, and the current detection section 24 for detecting the coil current I is an example of the presence notification receiving section.

The non-contact power supply device 2 includes the same number of coil driving blocks B, configured as described above, as the number of power supply coils 23.

For the purpose of discussion, a coil driving block B including a power supply coil 23(i) will be referred to as the coil driving block B(i). The current detection section 24 and the power source section 25 included in the coil driving block B(i), i.e., the current detection section 24 and the power source section 25 corresponding to the power supply coil 23(i), will be referred to as the current detection section 24(i) and the power source section 25(i), respectively. The coil current I detected by the current detection section 24(i), i.e., the coil current I flowing through the power supply coil 23(i), will be referred to as the coil current I(i). The power source sections 25(1) to 25(n) correspond to an example of the power source section recited in the claims.

The control section 4 includes a CPU for executing predetermined arithmetic operations, for example, a non-volatile ROM storing predetermined control programs therein, a volatile RAM for temporarily storing data, a rewritable non-volatile storage section 47 such as an EEPROM, for example, a timer circuit, and peripheral circuits, or the like.

For example, the RAM may store information representing a control state, i.e., whether each of the power supply coils 23(1) to 23(n) is supplying power (it is a candidate excitation coil or a confirmed excited coil) or is not supplying power (it is a non-excited coil). This makes it easy to grasp the states of the power supply coils 23(1) to 23(n).

The storage section 47 has, pre-stored therein, identification information indicating each of the power supply receiving devices 3 that are allowed to receive power supply.

Then, the control section 4 executes control programs stored in the ROM, for example, thereby implementing, function-wise, an interaction detection process section 41, a coil control section 42, a determination section 44, a confirmation process section 45, and a power supply process section 46, and thus serving as such.

The interaction detection process section 41 causes the power source sections 25 of the coil driving blocks B to supply a high-frequency voltage successively to the power supply coils 23. Then, the interaction detection process section 41 successively causes each of the current detection sections 24 of the coil driving blocks B to detect the coil current I of the power supply coil 23, as interaction information corresponding to the power supply coil 23 included in the coil driving block B, while a high-frequency voltage is supplied to the power supply coil 23.

Figure 4:
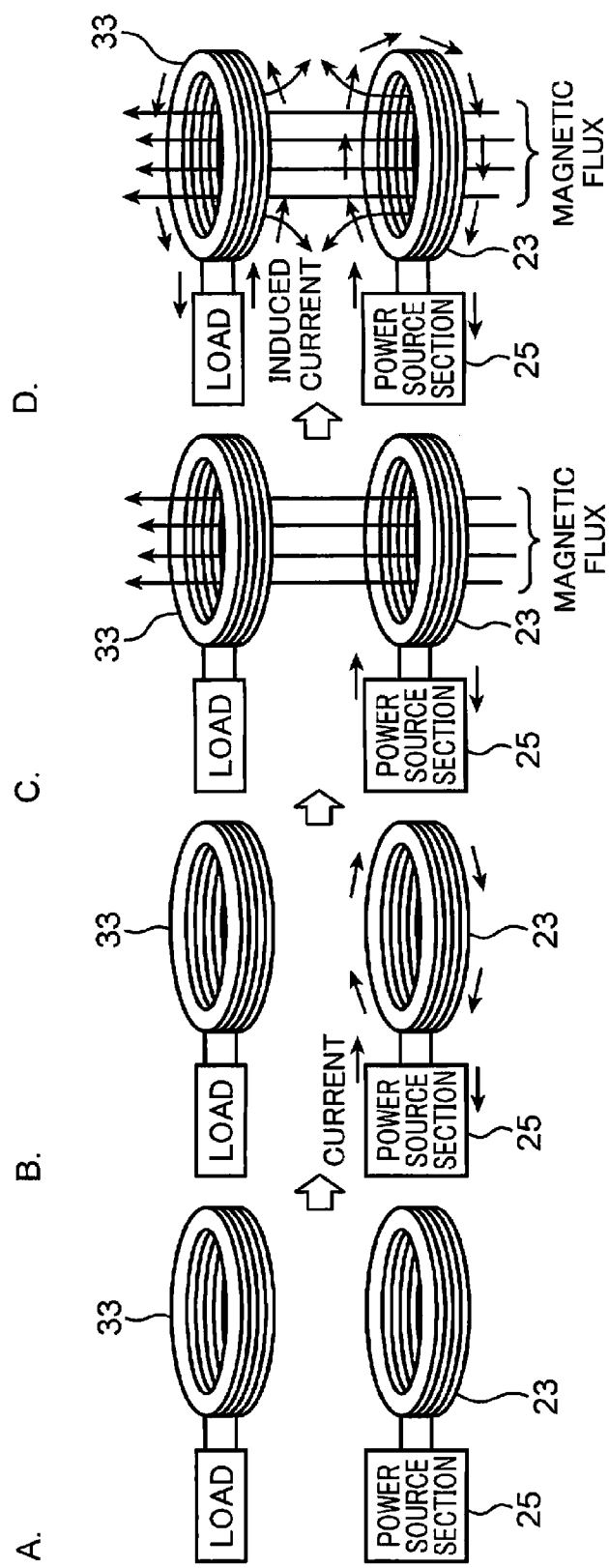
FIG. 4 A diagram illustrating inductance (interaction) of a power supply coil when the power supply coil and a power receiving coil are placed facing each other so as to lie over each other in the non-contact power supply system shown in FIG. 1.

FIG. 4 is a diagram illustrating an inductance (interaction) of a power supply coil 23 when the power supply coil 23 and the power receiving coil 33 are placed facing each other so as to lie over each other in the non-contact power supply system 1 shown in FIG. 1. First, as shown in FIG. 4A, the power supply coil 23 and the power receiving coil 33 are placed facing each other so as to lie completely over each other in the example shown in FIG. 4A so that their coil surfaces (to be described later) lie over each other.

Then, a voltage is output from the power source section 25, thereby producing a flow of coil current through the power supply coil 23 (FIG. 4B). When a coil current flows through the power supply coil 23, the power supply coil 23 generates an interlinkage magnetic flux running through the power supply coil 23 and the power receiving coil 33 (FIG. 4C).

When the interlinkage magnetic flux runs through the power receiving coil 33, a coil current of the opposite rotational direction to that of the power supply coil 23 flows through the power receiving coil 33 due to the electromagnetic induction phenomenon. The coil current of the opposite rotational direction generates an interlinkage magnetic flux of the opposite direction, to that of the power supply coil 23, through the power receiving coil 33. Therefore, a current flows through the power supply coil 23 so as to hinder the interlinkage magnetic flux generated through the power receiving coil 33 (FIG. 4D).

As described above, if the power supply coil 23 and the power receiving coil 33 are placed facing each other so that their coil surfaces lie over each other, the current flow through the power supply coil 23 varies between when the power supply coil 23 is present solely and when the power supply coil 23 and the power receiving coil 33 are placed facing each other, due to the interaction of the magnetic circuit formed by the power supply coil 23 and the power receiving coil 33. When the power supply coil 23 and the power receiving coil 33 are placed facing each other, the coil current I flowing through the power supply coil 23 increases, as compared with a case where the power supply coil 23 is present solely. Therefore, the apparent inductance of the power supply coil 23 changes between when the power supply coil 23 is present solely and when the power supply coil 23 and the power receiving coil 33 are placed facing each other.

Figure 5:
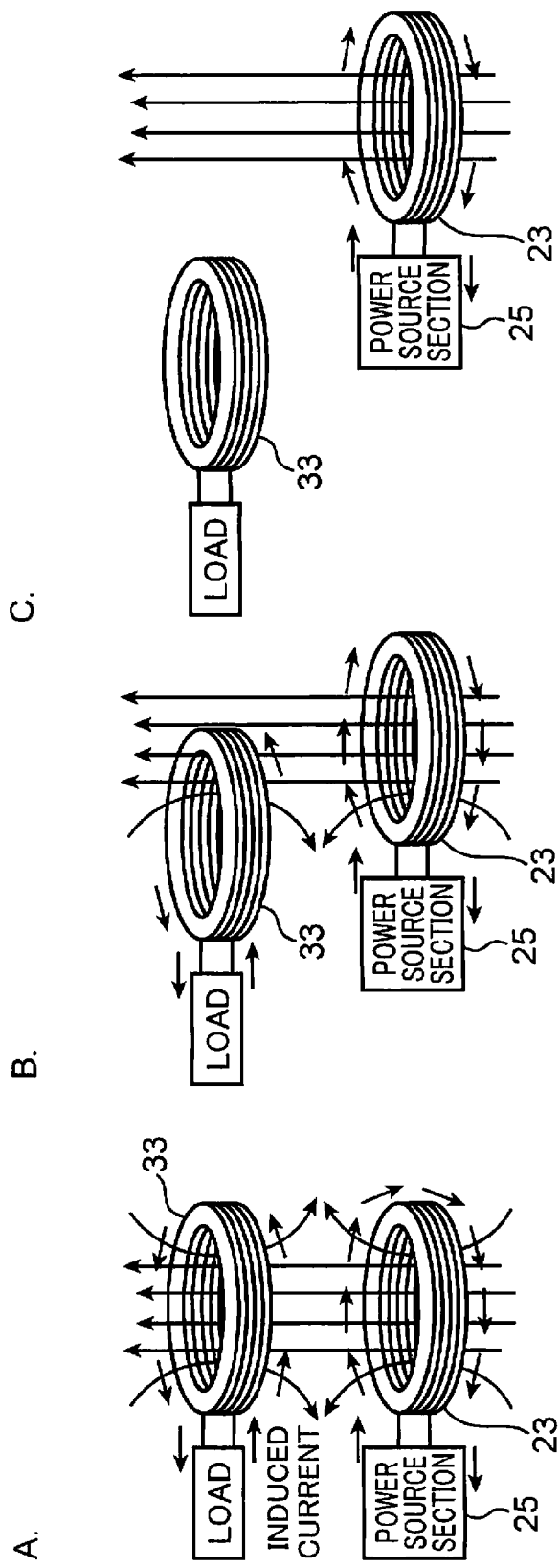
FIG. 5 A diagram illustrating interactions depending on the positional relationship between the power supply coil and the power receiving coil in the non-contact power supply system shown in FIG. 1.
Figure 6:
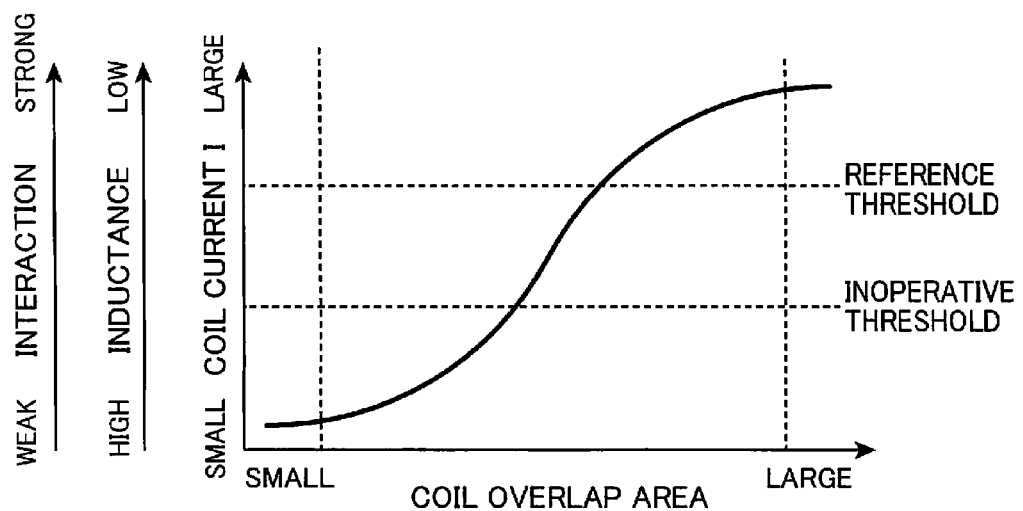
FIG. 6 A graph showing an example relationship between the inductance of the power supply coil and the overlap area between the power supply coil and the power receiving coil in the non-contact power supply system shown in FIG. 1.

FIG. 5 is a diagram illustrating interactions depending on the positional relationship between the power supply coil 23 and the power receiving coil 33 in the non-contact power supply system shown in FIG. 1. FIG. 6 is a graph showing an example relationship between the inductance of the power supply coil 23 and the overlap area between the power supply coil 23 and the power receiving coil 33 in the non-contact power supply system shown in FIG. 1.

FIG. 5A is a diagram illustrating showing a case where the position of the power supply coil 23 and the position of the power receiving coil 33 coincide with each other in terms of their coil axes. That is, FIG. 5A is a diagram illustrating an example where the power supply coil 23 and the power receiving coil 33 are placed facing each other so that their coil surfaces lie completely over each other, with the maximum overlap area between the power supply coil 23 and the power receiving coil 33.

The coil surface of the power supply coil 23 or the power receiving coil 33 is a plane that is encircled by the outermost winding of the power supply coil 23 or the power receiving coil 33 and that expands in the direction orthogonal to the interlinkage magnetic flux through the power supply coil 23 or the power receiving coil 33. The area of the power supply coil 23 is the area of the coil surface of the power supply coil 23, and the area of the power receiving coil 33 is the area of the coil surface of the power receiving coil 33. The overlap area between the power supply coil 23 and the power receiving coil 33 is the area over which the coil surface of the power supply coil 23 and the coil surface of the power receiving coil 33 are facing and overlapping each other.

Where the position of the power supply coil 23 and the position of the power receiving coil 33 coincide with each other in terms of their coil axes, as shown in FIG. 5A, the overlap area between the power supply coil 23 and the power receiving coil 33 is at maximum. When the overlap area between the power supply coil 23 and the power receiving coil 33 is at maximum, the number of lines of the interlinkage magnetic flux interlinking the power supply coil 23 and the power receiving coil 33 is at maximum, and the interaction between the power supply coil 23 and the power receiving coil 33 is at maximum. As a result, the inductance of the power supply coil 23 is at minimum.

When the position of the power supply coil 23 and the position of the power receiving coil 33 do not coincide with each other in terms of their coil axes, and the positions of the coil axes are misaligned with each other, as shown in FIG. 5B, the overlap area between the power supply coil 23 and the power receiving coil 33 is smaller than that shown in FIG. 5A. Therefore, the number of lines of the interlinkage magnetic flux interlinking the power supply coil 23 and the power receiving coil 33 decreases. Thus, the interaction between the power supply coil 23 and the power receiving coil 33 decreases, and as a result, the inductance of the power supply coil 23 will be larger than that shown in FIG. 5A.

When the position of the power supply coil 23 and the position of the power receiving coil 33 are completely misaligned with each other with no overlap between their coil surfaces, as shown in FIG. 5C, the overlap area between the power supply coil 23 and the power receiving coil 33 is zero. Therefore, there is no interaction between the power supply coil 23 and the power receiving coil 33, and the inductance of the power supply coil 23 is at maximum.

Thus, the overlap area between the power supply coil 23 and the power receiving coil 33 is in a predetermined relationship with the interaction, the inductance and the coil current I of the power supply coil 23. As shown in FIG. 6, for example, the larger the coil overlap area, the greater the interaction between the power supply coil 23 and the power receiving coil 33 is, the smaller the inductance is, and the larger the coil current I is.

Now, there is a one-to-one relationship as shown in FIG. 6 between the overlap area between the power supply coil 23 and the power receiving coil 33, and the interaction, the inductance and the coil current I of the power supply coil 23. Therefore, the inductance of the power supply coil 23 is an example of the interaction information representing the intensity of the interaction between the power supply coil 23 and the power receiving coil 33. Also, the coil current I is an example of the interaction information representing the intensity of the interaction between the power supply coil 23 and the power receiving coil 33. The current detection section 24 for detecting the coil current I is an example of the interaction detection section.

Note that a known measurement means capable of measuring the inductance of the power supply coil 23 may be used as the interaction detection section, instead of the current detection section 24.

Where L is the inductance of the power supply coil 23, V is the voltage of the high-frequency voltage output from the power source section 25, and f is the frequency, the coil current I of the power supply coil 23 is expressed as shown in Expression (1) below.

$$I = V/(2\pi f L) \tag{1}$$

Then, for example, a coil current I, which corresponds to an interaction that is slightly weaker by a margin than the interaction obtained where the position of the power supply coil 23 and the position of the power receiving coil 33 coincide with each other in terms of their coil axes, as shown in FIG. 5A, is pre-set as the reference threshold. This margin takes errors, etc., into consideration. Also, for example, another coil current I, which corresponds to an interaction that is slightly stronger by a margin than the interaction obtained when the position of the power supply coil 23 and the position of the power receiving coil 33 are completely misaligned with each other with no overlap between their coil surfaces, as shown in FIG. 5C, is pre-set as the inoperative threshold. This margin takes into consideration errors and the interaction occurring due to a foreign matter such as a metal piece, and the like.

Note that where the inductance is used as the interaction information, inductance values corresponding respectively to the coil currents I described above may be set as the reference threshold and the inoperative threshold, respectively.

The reference threshold corresponds to an example of information representing the reference interaction, and the inoperative threshold corresponds to an example of information representing the inoperative interaction.

The coil control section 42 performs a first process. In this first process, first, power supply coils, of the coil currents I(1) to I(n), through which a current exceeding the reference threshold corresponding to reference interaction has flown, are selected as candidate excitation coils. Then, a high-frequency voltage is supplied to the candidate excitation coils from the power source sections 25 corresponding to the candidate excitation coils.

The coil control section 42 performs a second process. In this second process, first, a power supply coil, of the coil currents I(1) to I(n), through which a current less than or equal to the reference threshold and greater than or equal to the inoperative threshold has flown, and other power supply coils that are adjacent to this power supply coil, are selected as candidate excitation coils. Then, a high-frequency voltage is supplied to the candidate excitation coils from the power source sections 25 corresponding respectively to the candidate excitation coils.

The coil control section 42 does not select, as a candidate excitation coil, a power supply coil, of the coil currents I(1) to I(n), of which the current value is less than the inoperative threshold, and does not supply a high-frequency voltage to the power supply coil.

The determination section 44 determines that a presence notification has been received by the current detection sections 24(1) to 24(n) when the coil currents I(1) to I(n) detected by the current detection sections 24(1) to 24(n) exhibit a change that corresponds to the presence notification during at least the second process, of the first process and the second process performed by the coil control section 42.

The confirmation process section 45 performs a confirmation process, in which if the determination section 44 has determined that the presence notification of any of the coil currents I(1) to I(n) has been received and if the identification information included in the received presence notification is stored in the storage section 47, a power supply coil 23, among other candidate excitation coils, that corresponds to the coil current I representing the presence notification is designated as a confirmed excited coil.

The power supply process section 46 supplies a high-frequency voltage to the confirmed excited coil from the corresponding power source section 25, and causes the power source section 25 to stop supplying a high-frequency voltage to candidate excitation coils other than the confirmed excited coil.

Figure 7:
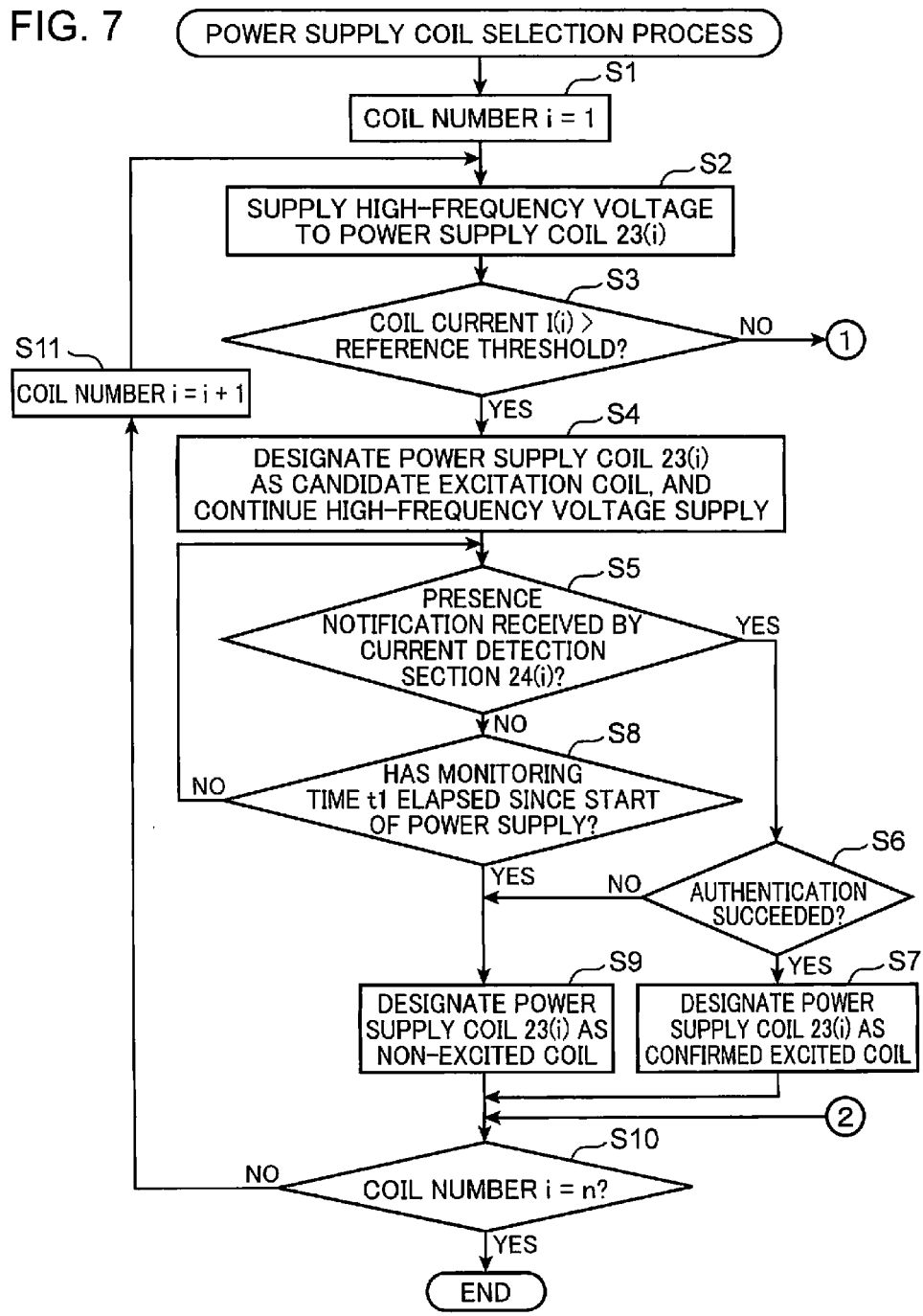
FIG. 7 A flow chart from step S1 to step S11 showing an example operation of the non-contact power supply device shown in FIG. 3.
Figure 8:
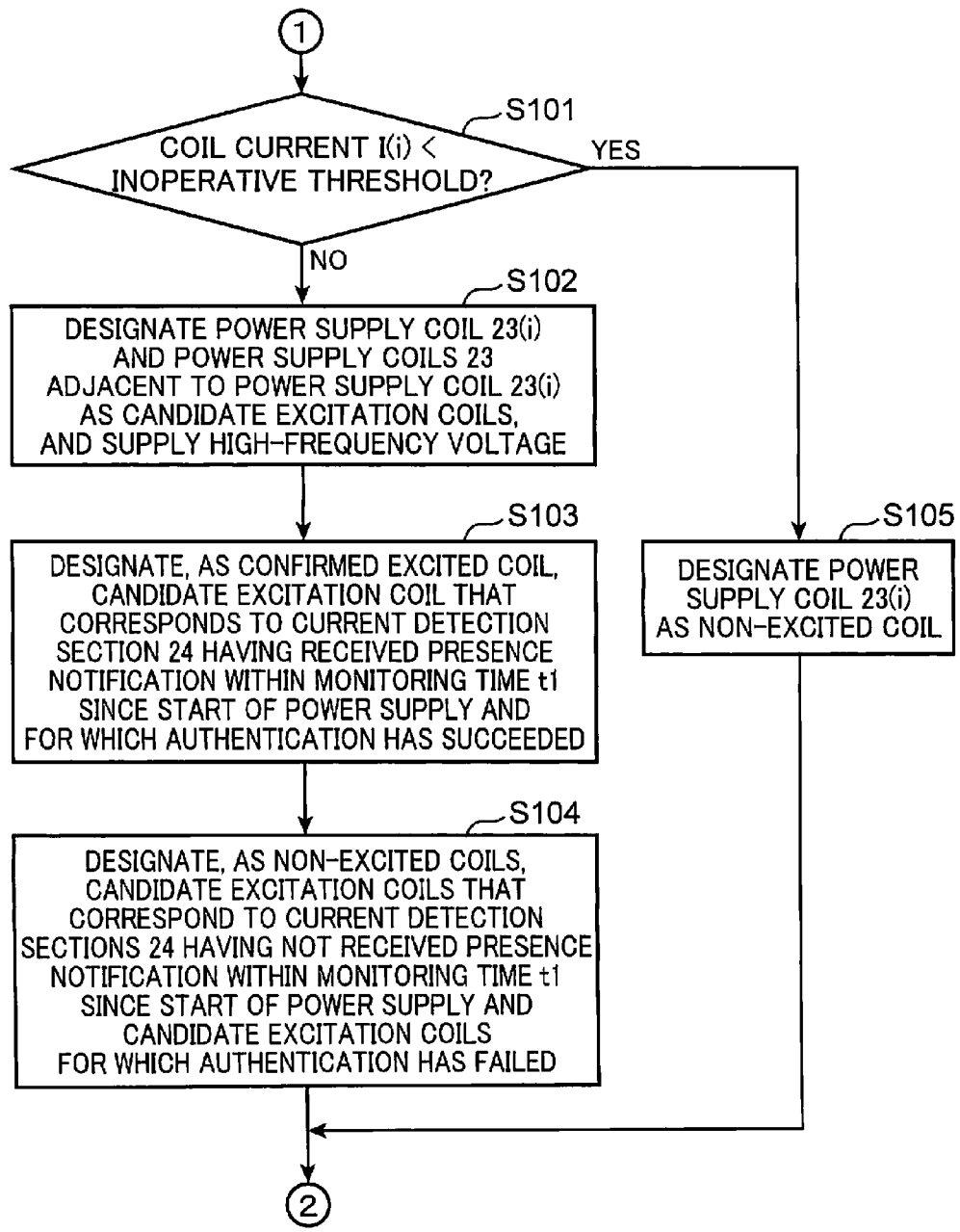
FIG. 8 A flow chart from step S101 to step S105 showing the example operation of the non-contact power supply device shown in FIG. 3.
Figure 9:
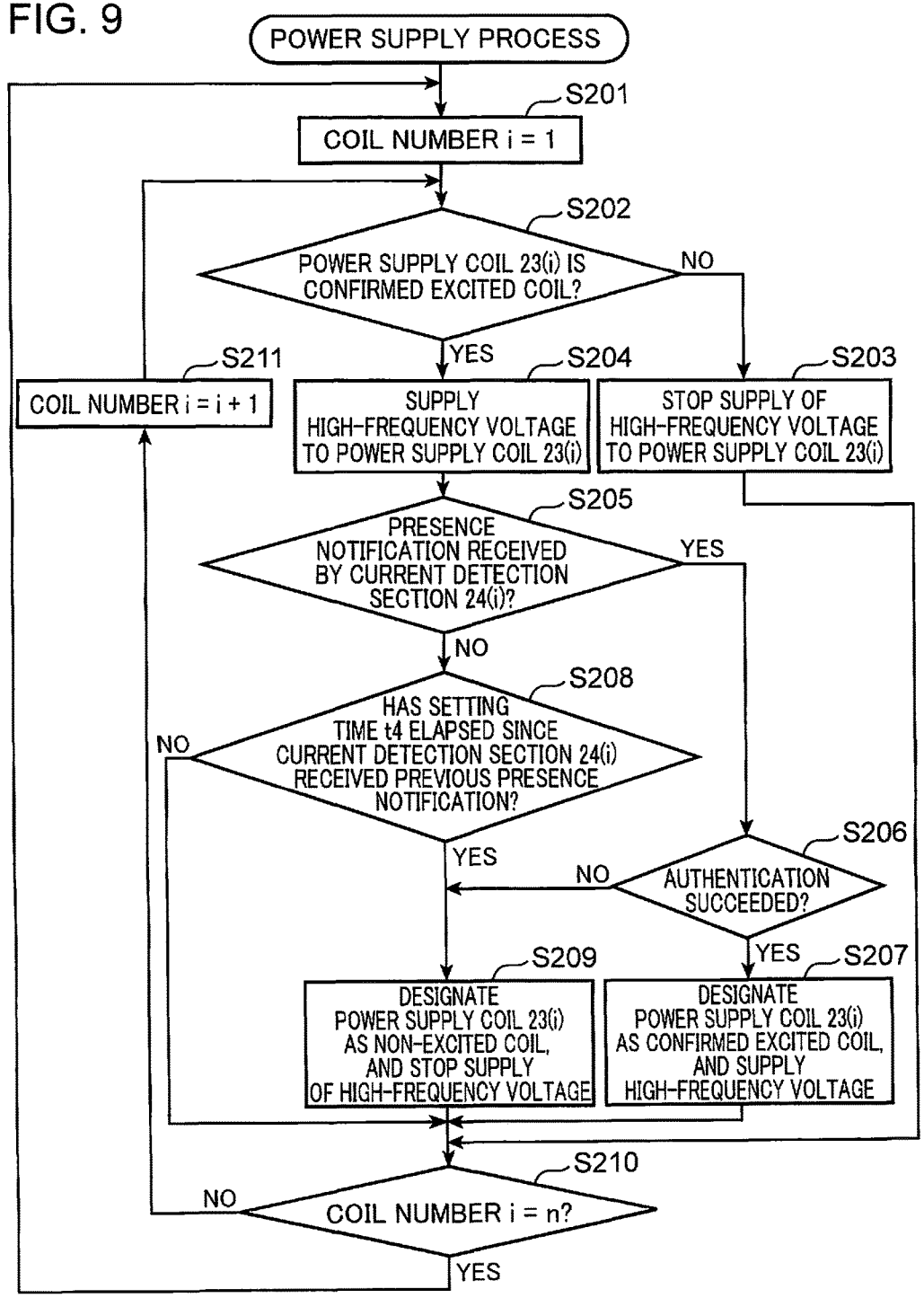
FIG. 9 A flow chart from step S201 to step S211 showing the example operation of the non-contact power supply device shown in FIG. 3.
Figure 10:
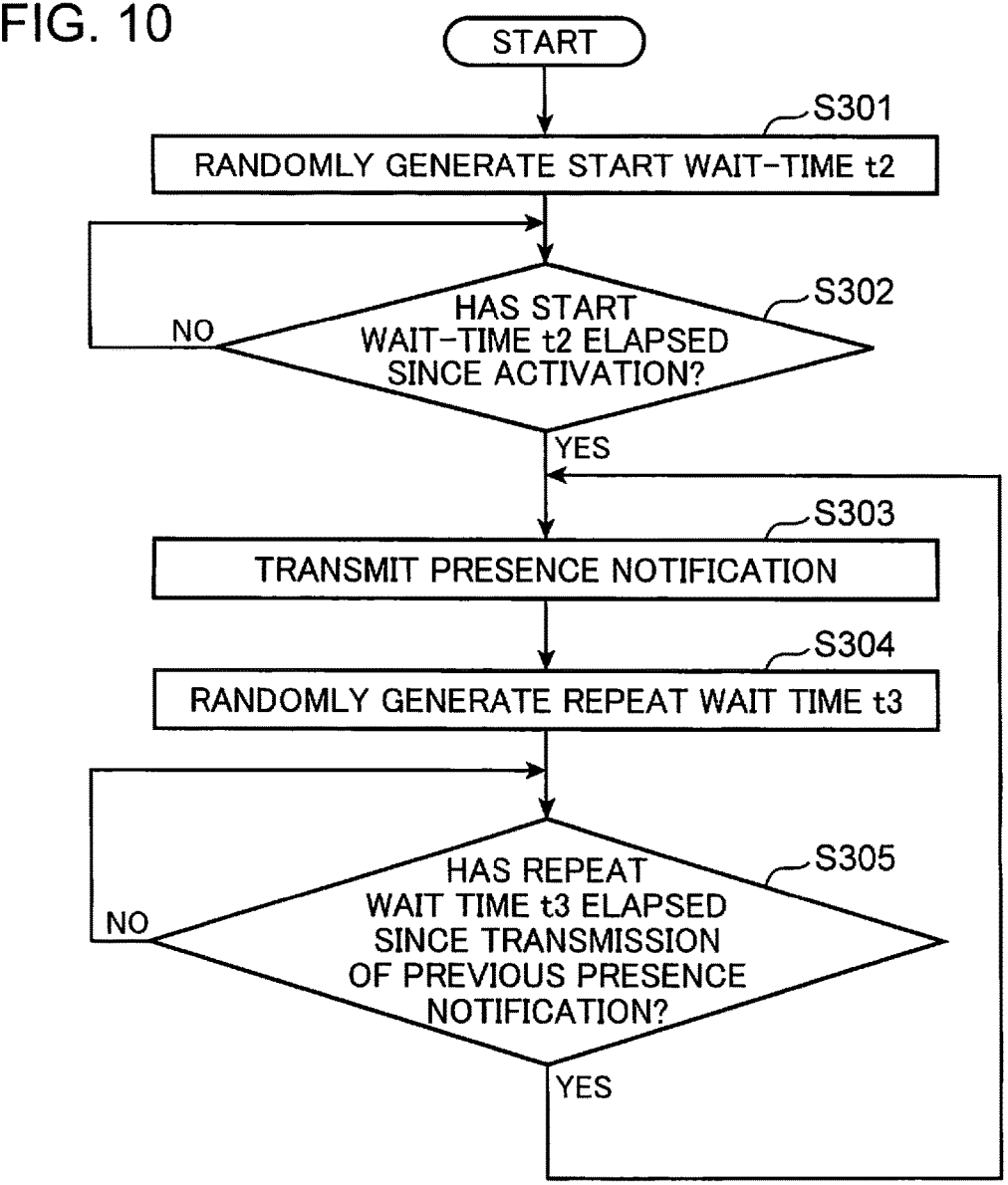
FIG. 10 A flow chart showing an example operation of the power supply receiving device shown in FIG. 2.

FIGS. 7 to 9 are flow charts each showing an example operation of the non-contact power supply device 2 shown in FIG. 3. FIG. 10 is a flow chart showing an example operation of the power supply receiving device 3 shown in FIG. 2. FIGS. 7 and 8 are flow charts showing an example power supply coil selection process performed by the non-contact power supply device 2. FIG. 9 is a flow chart showing an example power supply process performed by the non-contact power supply device 2. The power supply coil selection process shown in FIGS. 7 and 8 and the power supply process shown in FIG. 9 are performed in parallel, for example, by the non-contact power supply device 2.

First, the power supply coil selection process will be described. First, the interaction detection process section 41 initializes the coil number i to 1 (step S1). Then, the interaction detection process section 41 causes the power source section 25(i) to supply a high-frequency voltage to the power supply coil 23(i), thus starting the power supply (step S2).

Then, the coil control section 42 compares the coil current I(i) detected by the current detection section 24(i) with the reference threshold (step S3). Now, if the power supply coil 23(i) and the power receiving coil 33 are placed facing each other at substantially the same position as shown in FIG. 5A, for example, the coil current I(i) exceeds the reference threshold (YES in step S3), and the coil control section 42 proceeds to step S4, performing the process of step S4.

Now, if the power supply coil 23(i) and the power receiving coil 33 are placed facing each other at substantially the same position, if the power supply is started in step S2, the electric power received by the power receiving coil 33 of the power supply receiving device 3 is supplied to the control section 34. As a result, the control section 34 is activated, and the control section 34 starts operating (FIG. 10).

Note that although not shown in FIG. 2, the power supply receiving device 3 may include a power source circuit for converting the output voltage of the power receiving coil 33 to an operation voltage of the control section 34, for example.

Referring back to FIG. 7, in step S4, the coil control section 42 sets the power supply coil 23(i) as a candidate excitation coil, and allows the supply of the high-frequency voltage by the power source section 25(i) to continue. Step S4 corresponds to an example of the first process, and the period over which steps S4 to S8 are performed, during which the supply of the high-frequency voltage continues by step S4, corresponds to the period of execution of the first process.

Next, the determination section 44 checks whether a change representing the presence notification has occurred in the coil current I(i) detected by the current detection section 24(i). That is, the determination section 44 checks whether the presence notification has been received by the current detection section 24(i) (step S5).

Referring to FIG. 10, when the control section 34 is activated and the presence notification section 341 starts operating, the presence notification section 341 randomly generates a start wait-time t2 (step S301). The presence notification section 341 generates the start wait-time t2 by using a random number generation method known in the art, for example. Alternatively, the start wait-time t2 may be generated by using a random number generation circuit known in the art. Note that the start wait-time t2 is set within a range of a shorter period of time than a monitoring time t1 to be described later.

Then, when the start wait-time t2 has elapsed from the activation of the control section 34 (YES in step S302), the presence notification section 341 proceeds to step S303, performing the process of step S303. In step S303, the presence notification section 341 turns ON/OFF the switching element SW1 in accordance with the identification information of itself stored in the ID storing section 342. As a result, the presence notification including (representing) the identification information of the power supply receiving device 3 is transmitted from the power supply receiving device 3 to the power supply coil 23(i).

Figure 11:
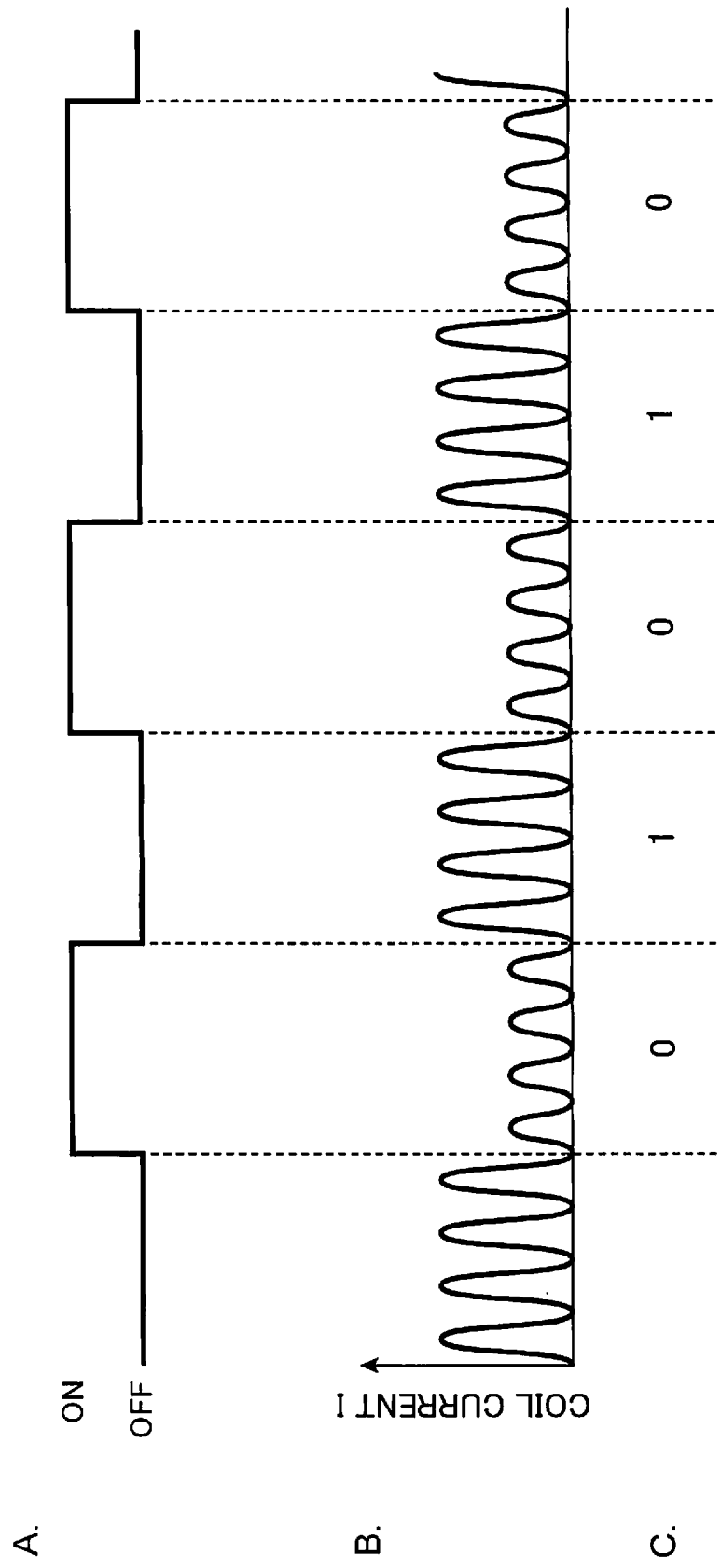
FIG. 11 A diagram illustrating an example relationship between the ON/OFF of the switching element and the coil current in the non-contact power supply system shown in FIG. 1.

FIG. 11 is a diagram illustrating an example relationship between the ON/OFF of the switching element SW1 and the coil current I. As shown in FIG. 11A, the amplitude (peak-to-peak value) of the coil current I(i) is smaller when the switching element SW1 is turned ON than when the switching element SW1 is OFF. The amplitude (peak-to-peak value) of the coil current I(i) is larger when the switching element SW1 is turned OFF than when the switching element SW1 is ON.

In step S5, the determination section 44 determines that the presence notification is received by the current detection section 24(i) (YES in step S5) when the amplitude of the coil current I(i) changes to be smaller (when the switching element SW1 is turned ON), for example.

Now, there are cases where a plurality of power supply receiving devices 3 are placed on the loading surface 22 of the power supply device 2. In such cases, should the control sections 34 of the power supply receiving devices 3 be activated generally simultaneously to start transmitting presence notifications from the presence notification sections 341 of the power supply receiving devices 3, the presence notifications of the power supply receiving devices 3 may interfere with one another. When the presence notifications interfere with one another, the power supply device 2 may not be able to normally receive the presence notifications or to properly obtain the identification information included in the presence notifications.

In view of this, in the present embodiment, the start wait-times t2 are randomly generated through the processes of steps S301 to S303 by the power supply receiving devices 3, the timings with which presence notifications are transmitted from the power supply receiving devices 3 can be made to differ from one another. As a result, even if a plurality of power supply receiving devices 3 are placed on the loading surface 22 of the power supply device 2, it is possible to reduce the possibility of interference between presence notifications of the power supply receiving devices 3.

After the transmission of the presence notification in step S303 of FIG. 10, the presence notification section 341 randomly generates a repeat wait time t3 (step S304). The presence notification section 341 generates the repeat wait time t3 by using a random number generation method known in the art, for example. Alternatively, the repeat wait time t3 may be generated by using a random number generation circuit known in the art. Note that the repeat wait time t3 is set within a range of a shorter period of time than a setting time t4 to be described later.

Then, the presence notification section 341 checks if the repeat wait time t3 has elapsed from the point in time when the previous presence notification was transmitted (step S305). If the random repeat wait time t3 has elapsed (YES), the presence notification section 341 repeats steps S303 to S305. That is, the presence notification section 341 repeats transmitting the presence notification at intervals of the random repeat wait time t3.

Referring back to FIG. 7, the confirmation process section 45 obtains the identification information of the power supply receiving device 3 based on the pattern of change in the coil current I(i). For example, the confirmation process section 45 assigns "0" (or "1") to instances where the amplitude of the coil current I becomes smaller and "1" (or "0") to instances where the amplitude of the coil current I becomes larger, as shown in FIGS. 11B and 11C. Thus, the confirmation process section 45 obtains the identification information of the power supply receiving device 3 based on the pattern of change in the coil current I(i).

Then, if the obtained identification information is stored in the storage section 47, the confirmation process section 45 determines that the authentication of the power supply coil 23(i) has succeeded (YES in step S6), and proceeds to step S7, performing the process of step S7. On the other hand, if the obtained identification information is not stored in the storage section 47, the confirmation process section 45 determines that the authentication of the power supply coil 23(i) has failed (NO in step S6), and proceeds to step S9, performing the process of step S9.

If the authentication succeeds, the confirmation process section 45 designates the power supply coil 23(i) as a confirmed excited coil (step S7), and proceeds to step S10 so as to continue the power supply coil selection process, performing the process of step S10. A high-frequency voltage is supplied by a power supply process to be described later to the power supply coil 23(i) designated as a confirmed excited coil.

On the other hand, if the authentication fails, the confirmation process section 45 designates the power supply coil 23(i) as a non-excited coil (step S9), and proceeds to step S10 so as to continue the power supply coil selection process, performing the process of step S10. The supply of the high-frequency voltage is stopped by the power supply process to be described later for the power supply coil 23(i) designated as a non-excited coil.

For example, where a power supply receiving device 3, counterfeited by a third party, is placed on the loading surface 22, if the non-contact power supply is provided to such a power supply receiving device 3, it may be impossible to ensure the security. In view of this, the non-contact power supply is provided only to power supply receiving devices 3 that are successfully authenticated through the processes of steps S5 to S7 and S9. This improves the reliability of assuring the security.

Note that the process of step S6 does not need to be performed, and when the presence notification is received by the current detection section 24(i) (YES in step S5), step S7 may be performed.

On the other hand, in step S5, if an amplitude change in the coil current I(i) is not detected and the presence notification is not received (NO in step S5), for example, the determination section 44 determines whether or not the elapsed time since the start of power supply of step S2 has exceeded the predetermined monitoring time t1 (step S8).

If the determination section 44 determines that the amount of time since the start of power supply has not exceeded the monitoring time t1 (NO in step S8), control returns again to the process of step S5. On the other hand, if the amount of time since the start of power supply has exceeded the monitoring time t1 (YES in step S8), the determination section 44 determines that the current detection section 24(i) has not received a presence notification, and accordingly that the power supply coil 23(i) is not facing the power receiving coil 33 so as to overlap the power receiving coil 33, and proceeds to step S9, performing the process of step S9.

In step S9, the confirmation process section 45 designates the power supply coil 23(i) as a non-excited coil, and proceeds to step S10 so as to continue the power supply coil selection process, performing the process of step S10. The supply of the high-frequency voltage is stopped by the power supply process to be described later for the power supply coil 23(i) designated as a non-excited coil.

For example, if a piece of metal, such as a coin, is placed at a position facing the power supply coil 23(i), an interaction occurs between the piece of metal and the power supply coil 23(i) due to the eddy current flowing through the piece of metal. Therefore, in step S3, the power supply coil 23(i) may possibly exceed the reference threshold. However, since a piece of metal never transmits a presence notification, the processes of steps S5, S8 and S9 prevent the power supply coil 23 facing the piece of metal from being erroneously designated as a confirmed excited coil.

On the other hand, in step S3, if the position of the power supply coil 23($i$) and the position of the power receiving coil 33 are misaligned with each other as shown in FIG. 5B or 5C, for example, the coil current I(i) will be less than or equal to the reference threshold (NO in step S3), and the interaction detection process section 41 proceeds to step S101 of FIG. 8.

In step S101, the coil control section 42 compares the coil current I(i) detected by the current detection section 24($i$) and the inoperative threshold (step S101). Now, if the power supply coil 23($i$) and the power receiving coil 33 are placed so that the coil surface of the power supply coil 23 and the coil surface of the power receiving coil 33 lie partially over each other as shown in FIG. 5B, for example, the coil current I(i) will be greater than or equal to the inoperative threshold (NO in step S101), and the coil control section 42 proceeds to step S102, performing the process of step S102.

In step S102, the coil control section 42 designates the power supply coil 23($i$) and other power supply coils 23 that are adjacent to this power supply coil 23($i$) as candidate excitation coils. Then, the coil control section 42 causes the power source sections 25 corresponding respectively to these power supply coils 23 to supply the high-frequency voltage to the candidate excitation coils. Step S102 corresponds to an example of the second process, and the period over which steps S102 to S104 are performed, during which the supply of the high-frequency voltage continues by step S102, corresponds to the period of execution of the second process.

FIG. 12 is a diagram illustrating power supply coils 23 to be candidate excitation coils in step S102. In FIG. 12, candidate excitation coils are indicated by hatching with diagonal lines.

In step S102, the coil control section 42 designates, as candidate excitation coils, the power supply coil 23($i$) and four other power supply coils 23 that are adjacent to the power supply coil 23($i$) in the front-back and left-right directions, as shown in FIG. 12A, for example. Alternatively, the coil control section 42 may designate, as candidate excitation coils, the power supply coil 23($i$) and eight other power supply coils 23 that are adjacent to the power supply coil 23($i$) in the front-back, left-right and diagonal directions, as shown in FIG. 12B, for example.

Where a plurality of power supply coils 23 are arranged in a single line, for example, the coil control section 42 may designate, as candidate excitation coils, the power supply coil 23($i$) and two other power supply coils 23 that are on opposite sides of the power supply coil 23($i$).

Then, in step S103, the determination section 44 checks whether a presence notification has been received through a process similar to step S5, for the candidate excitation coils. Then, if a presence notification is received by a current detection section 24 corresponding to a candidate excitation coil within the monitoring time t1 from the start of power supply by step S102, the determination section 44 notifies the confirmation process section 45 of the current detection section 24 which has received the presence notification.

Based on the notification from the determination section 44, the confirmation process section 45 determines whether or not the authentication has succeeded through a process similar to that of step S6 for the candidate excitation coil (the power supply coil 23) corresponding to the current detection section 24 which has received the presence notification. Then, the confirmation process section 45 designates, as a confirmed excited coil, a candidate excitation coil (a power supply coil 23) for which the authentication has succeeded (step S103). A high-frequency voltage is supplied by a power supply process to be described later to the power supply coil 23 designated as a confirmed excited coil.

Then, in step S104, the determination section 44 notifies the confirmation process section 45 of any current detection section 24 that has not received a presence notification within the monitoring time t1 from the start of power supply by step S102.

Based on the notification from the determination section 44, the confirmation process section 45 designates, as non-excited coils, any candidate excitation coil corresponding to a current detection section 24 that has not received a presence notification and any candidate excitation coil for which the authentication has failed (step S104). The supply of the high-frequency voltage is stopped by the power supply process to be described later for the power supply coils 23 designated as non-excited coils. Then, the coil control section 42 proceeds to step S10 of FIG. 7 so as to continue the power supply coil selection process, performing the process of step S10.

Figure 13:
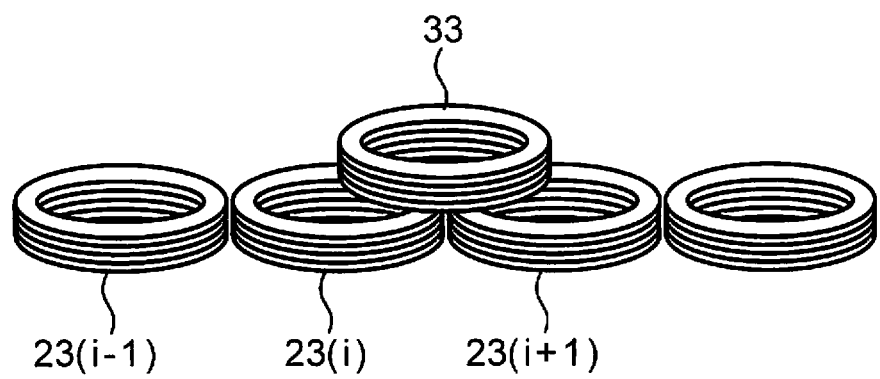
FIG. 13 A diagram illustrating a case where the power receiving coil is placed at a position between a plurality of power supply coils in the non-contact power supply system shown in FIG. 1.

For example, as shown in FIG. 13, when the power receiving coil 33 is placed at a position between a plurality of power supply coils 23 adjacent to each other, if a high-frequency voltage is supplied only to the power supply coil 23($i$), the following problem may possibly occur.

That is, where the coil surface of the power receiving coil 33 is placed so as to overlap coil surfaces of a plurality of power supply coils 23, the interlinkage magnetic flux interlinking the power supply coil 23($i$) and the power receiving coil 33 is less than the interlinkage magnetic flux obtained when the power supply coil 23($i$) and the power receiving coil 33 are placed facing each other so that their coil axes coincide with each other.

As a result, the electric power to be received by the power receiving coil 33 when the high-frequency voltage is supplied only to the power supply coil 23($i$) is less than the electric power to be obtained when the power supply coil 23($i$) and the power receiving coil 33 are placed facing each other so that their coil axes coincide with each other.

Therefore, in the power supply receiving device 3, the electric power received by the power receiving coil 33 is less than the electric power required to activate the control section 34, thereby failing to activate the control section 34. If the control section 34 is not activated, the presence notification section 341 cannot transmit the presence notification, and the confirmation process section 45 will therefore fail the authentication of the power supply receiving device 3. As a result, the supply of the high-frequency voltage to the power supply coil 23($i$) is stopped, and it is no longer possible to supply the electric power to the power supply receiving device 3.

In view of this, the coil control section 42 selects, as candidate excitation coils, not only the power supply coil 23($i$), but also other power supply coils 23 that are adjacent to the power supply coil 23($i$), in step S102 of FIG. 8. Then, the coil control section 42 causes the power source sections 25 corresponding respectively to the power supply coil 23($i$) and the power supply coils adjacent to the power supply coil 23($i$) to supply the high-frequency voltage to these candidate excitation coils.

Thus, in the example shown in FIG. 13, the high-frequency voltage is supplied to the power supply coil 23($i$) and the power supply coils 23($i$−1) and 23($i$+1) adjacent to the power supply coil 23($i$). As a result, electric power is supplied from the power supply coils 23($i$) and 23($i$+1) to the power receiving coil 33. As a result, the possibility of electric power shortage at the power supply receiving device 3 is reduced, and the possibility of failing to activate the control section 34 is reduced.

Then, when the control section 34 is activated, the presence notification is received by the current detection sections 24 corresponding to the power supply coils 23(*i*) and 23(*i*+1) the coil surfaces of which face the coil surface of the power receiving coil 33. As a result, in step S103, the power supply coils 23(*i*) and 23(*i*+1) are designated as confirmed excited coils, and electric power is supplied to the power receiving coil 33 by the power supply coils 23(*i*) and 23(*i*+1). Therefore, since electric power is supplied to the power receiving coil 33 by a plurality of power supply coils 23, it is possible to reduce the possibility of shortage of electric power to be received by the power receiving coil 33.

Since no presence notification is received by the current detection section 24(*i*−1) corresponding to the power supply coil 23(*i*−1) which is not facing the power receiving coil 33, the power supply coil 23(*i*−1) is designated as a non-excited coil in step S104. As a result, the supply of the high-frequency voltage to the power supply coil 23(*i*−1) which is not facing the power receiving coil 33 is stopped. Thus, it is possible to stop the supply of the high-frequency voltage to any of the power supply coils 23, which have been designated as candidate excitation coils, the coil surface of which faces the coil surface of the power receiving coil 33.

On the other hand, in step S101, as shown in FIG. 5C, for example, in a sate where the coil surface of the power supply coil 23 does not face the coil surface of the power receiving coil 33 at all, if the power supply coil 23(*i*) and the power receiving coil 33 are completely misaligned with each other with no overlap between their coil surfaces, the coil current I(i) will be less than the inoperative threshold (YES in step S101), and the coil control section 42 proceeds to step S105, performing the process of step S105.

In step S105, the coil control section 42 designates the power supply coil 23(*i*) as a non-excited coil, and proceeds to step S10 so as to continue the power supply coil selection process, performing the process of step S10. The supply of the high-frequency voltage is stopped by the power supply process to be described later for the power supply coil 23(*i*) designated as a non-excited coil.

Thus, if a foreign matter such as a piece of metal, which exhibits a weaker interaction than the interaction corresponding to the inoperative threshold, for example, is placed facing the coil surface of the power supply coil 23(*i*), the supply of the high-frequency voltage to the power supply coil 23(*i*) is stopped. This reduces the possibility of heating a foreign matter such as a piece of metal.

As described above, through the processes of steps S101 and S105, any power supply coil 23 the coil surface of which is not at all facing the coil surface of the power receiving coil 33 is quickly designated as a non-excited coil, and the supply of the high-frequency voltage to that power supply coil 23 is quickly stopped.

Referring back to FIG. 7, in step S10, the interaction detection process section 41 determines whether or not the coil number i is n. If the coil number i is n (YES in step S10), the process is ended. On the other hand, if the coil number i is not n (NO in step S10), the process proceeds to step S11 so as to perform the power supply coil selection process for the next power supply coil 23, performing the process of step S11.

In step S11, the interaction detection process section 41 increments the coil number i by adding 1 to the coil number i, and repeats the processes of step S2 and subsequent steps.

FIG. 9 is a flow chart showing an example of the power supply process by the non-contact power supply device 2 shown in FIG. 3. The power supply process section 46 initializes the coil number i to 1 (step S201). Then, the power supply process section 46 determines whether or not the power supply coil 23(*i*) is a confirmed excited coil (step S202).

Then, if the power supply coil 23(*i*) is not a confirmed excited coil (NO in step S202), the power supply process section 46 causes the power source section 25(*i*) to stop the supply of the high-frequency voltage to the power supply coil 23(*i*) (step S203), and proceeds to step S210 so as to perform the power supply process for the next power supply coil 23, performing the process of step S210.

On the other hand, if the power supply coil 23(*i*) is a confirmed excited coil (YES in step S202), the power supply process section 46 causes the power source section 25(*i*) to supply the high-frequency voltage to the power supply coil 23(*i*) (step S204).

Then, through a process similar to step S5, the power supply process section 46 determines whether or not a change representing a presence notification has occurred in the coil current I(i) detected by the current detection section 24(*i*). That is, the power supply process section 46 determines whether or not a presence notification has been received by the current detection section 24(*i*) (step S205).

In step S205, when the amplitude of the coil current I(i) changes to be smaller, for example (when the switching element SW1 is turned ON), the power supply process section 46 determines that a presence notification has been received by the current detection section 24(*i*) (YES in step S205), and proceeds to step S206, performing the process of step S206.

Then, the power supply process section 46 obtains the identification information of the power supply receiving device 3 from the pattern of change in the coil current I(i) through a process similar to step S6. If the obtained identification information is stored in the storage section 47, the power supply process section 46 determines that the authentication has succeeded (YES in step S206), and proceeds to step S207, performing the process of step S207. On the other hand, if the obtained identification information is not stored in the storage section 47, the power supply process section 46 determines that the authentication has failed (NO in step S206), and proceeds to step S209, performing the process of step S209.

If the authentication has succeeded (YES in step S206), the power supply process section 46 selects the power supply coil 23(*i*) as a confirmed excited coil, and causes the power source section 25(*i*) to supply the high-frequency voltage to the power supply coil 23(*i*) (step S207).

On the other hand, if the authentication has failed (NO in step S206), the power supply process section 46 selects the power supply coil 23(*i*) as a non-excited coil, and causes the power source section 25(*i*) to stop supplying the high-frequency voltage to the power supply coil 23(*i*) (step S209). Then, the power supply process section 46 proceeds to step S210 so as to continue the power supply process, performing step S210.

On the other hand, in step S205, if the amplitude change in the coil current I(i) is not detected and the presence notification has not been received by the current detection section 24(*i*) (NO in step S205), for example, the power supply process section 46 determines the setting time t4 has elapsed from the point in time when the previous presence notification was received by the current detection section 24(*i*) (step S208). The setting time t4 may be the same length of time as the start wait-time t2, for example.

Then, if the elapsed time since the point in time when the previous presence notification was received has not exceeded the setting time t4 (NO in step S208), the power supply process section 46 proceeds to step S210 so as to perform the power supply process for the next power supply coil 23, performing step S210.

On the other hand, if the elapsed time since the point in time when the previous presence notification was received has exceeded the setting time t4 (YES in step S208), the power supply process section 46 selects the power supply coil 23(*i*) as a non-excited coil, and causes the power source section 25(*i*) to stop supplying the high-frequency voltage to the power supply coil 23(*i*) (step S209). Then, the power supply process section 46 proceeds to step S210 so as to continue the power supply process, performing step S210.

For example, after a power supply receiving device 3 is placed on the loading surface 22 and the non-contact power supply from the power supply coil 23 to the power supply receiving device 3 once starts, the power supply receiving device 3 may be removed from the loading surface 22. In such a case, continuing the supply of the high-frequency voltage from the power source section 25 to the power supply coil 23 results in a loss of energy and is not preferable.

In view of this, with the processes of steps S205, S208 and S209, if the power supply receiving device 3 is removed from the position facing the coil surface of the power supply coil 23(*i*) after starting the non-contact power supply from the power supply coil 23(*i*), the presence notification will stop being received within the setting time t4. As a result, the proceeds to step S209, thereby stopping the supply of a high-frequency voltage from the power source section 25(*i*) to the power supply coil 23(*i*).

Where it is desirable for the power supply receiving device 3 to be able to stop the power supply from the non-contact power supply device 2, for example, the presence notification section 341 may be configured so as not to perform the process of transmitting the presence notification in step S303 of FIG. 10. In such a case, the presence notification will stop being received within the setting time t4. As a result, with the processes of steps S205, S208 and S209, the process proceeds to step S209, thereby stopping the supply of the high-frequency voltage from the power source section 25(*i*) to the power supply coil 23(*i*). Thus, the power supply receiving device 3 is allowed to stop the power supply from the power supply device 2.

Now, with the processes of steps S303 to S305 of FIG. 10, the presence notification is transmitted at intervals of the random repeat wait time t3. Therefore, even if a plurality of power supply receiving devices 3 are placed on the loading surface 22 of the power supply device 2, it is possible to reduce the interference between presence notifications from the power supply receiving devices 3.

Referring back to FIG. 9, in step S210, the power supply process section 46 determines whether or not the coil number i is n. If the coil number i is not n (NO in step S210), the power supply process section 46 increments the coil number i by adding 1 to the coil number i (step S211) so as to perform the power supply process for the next power supply coil 23, and repeats the processes of steps S202 to S210.

On the other hand, if the coil number i is n (YES in step S210), the power supply process section 46 repeats the processes of steps S201 to S210.

Note that the power supply receiving device 3 may not include the switching element SW1 and the resistor R, but may instead include a communication means such as a communication coil for transmitting a response notification. Then, the presence notification section 341 may transmit a response notification to the power supply device 2 via the communication means. In such a case, the power supply device 2 may include a plurality of communication means such as communication coils so as to correspond to the power supply coils 23 for receiving response notifications. Then, the determination section 44 may perform the process described above based on the response notification received from the communication means.

The power supply receiving device 3 may not include the ID storing section 342, and the presence notification section 341 may not transmit a presence notification including (representing) the identification information of itself. For example, the presence notification section 341 may be configured to transmit the presence notification from the power supply receiving device 3 to the power supply coil 23(*i*) by turning the switching element SW1 ON and OFF once, for example. In such a case, the power supply device 2 may not include the storage section 47, the confirmation process section 45 may proceed to step S7, without performing the process of step S6, if step S5 returns YES. The coil control section 42 may perform processes in steps S103 and S104, irrespective of the result of authentication.

The presence notification section 341 may not perform processes of steps S304 and S305 of FIG. 10. The power supply process section 46 may proceed to step S210 after step S204, performing the process of step S210, without performing the processes of steps S205 to S209.

The presence notification section 341 may not perform the process of step S301, and the start wait-time t2 may be a predetermined fixed length of time. The presence notification section 341 may not perform the process of step S304, and the repeat wait time t3 may be a predetermined fixed length of time.

The power supply receiving device 3 may be configured without the switching element SW1, the resistor R, the presence notification section 341 and the ID storing section 342. The power supply device 2 may not include the determination section 44 and the confirmation process section 45, may not perform the processes of steps S5 to S9, proceeding to step S10 after step S4, may not perform the processes of steps S103 and S104, proceeding to step S10 after step S102, and may not perform the processes of steps S205 to S209, proceeding to step S210 after step S204, performing the process of step S210.

If step S3 returns NO, the process may proceed to step S102, performing the process of step S102, without performing the processes of steps S101 and S105.

While the present specification discloses various embodiments of techniques as described above, primary ones of the disclosed techniques will be summarized below.

A non-contact power supply system according to one embodiment includes a non-contact power supply device for supplying electric power through an electromagnetic induction phenomenon, and a power supply receiving device (power supply target device) including a power receiving coil receiving the electric power from the non-contact power supply device. The non-contact power supply device includes a plurality of power supply coils, a power source section, a plurality of interaction detection sections, and a coil control section for performing first and second processes. The plurality of power supply coils are placed so that the power receiving coil can be placed facing the power supply coils. The power source section selectively supplies a high-frequency voltage to the plurality of power supply coils. The plurality of interaction detection sections are provided so as to correspond respectively to the plurality of power supply coils for detecting, as interaction information corresponding respectively to the power supply coils, intensities of magnetic interactions between the power receiving coil and the power supply coils. The first process is a process of selecting, as a candidate excitation coil, a power supply coil corresponding to first interaction information, of the interaction information, that indicates a first interaction stronger than a predetermined reference interaction, and causing the power source section to supply the high-frequency voltage to the candidate excitation coil. The second process is a process of selecting, as candidate excitation coils, a power supply coil corresponding to second interaction information, of the interaction information, that indicates a second interaction weaker than the reference interaction and a power supply coil adjacent to the power supply coil, and causing the power source section to supply the high-frequency voltage to the candidate excitation coils.

A non-contact power supply device according to another embodiment is a non-contact power supply device for supplying electric power to a power supply receiving device including a power receiving coil for receiving electric power through an electromagnetic induction phenomenon, the non-contact power supply device including a plurality of power supply coils, a power source section, a plurality of interaction detection sections, and a coil control section for performing first and second processes. The plurality of power supply coils are placed so that the power receiving coil can be placed facing the power supply coils. The power source section selectively supplies a high-frequency voltage to the plurality of power supply coils. The plurality of interaction detection sections are provided so as to correspond respectively to the plurality of power supply coils for detecting, as interaction information corresponding respectively to the power supply coils, intensities of magnetic interactions between the power receiving coil and the power supply coils. The first process is a process of selecting, as a candidate excitation coil, a power supply coil corresponding to first interaction information, of the interaction information, that indicates a first interaction stronger than a predetermined reference interaction, and causing the power source section to supply the high-frequency voltage to the candidate excitation coil. The second process is a process of selecting, as candidate excitation coils, a power supply coil corresponding to second interaction information, of the interaction information, that indicates a second interaction weaker than the reference interaction and a power supply coil adjacent to the power supply coil, and causing the power source section to supply the high-frequency voltage to the candidate excitation coils.

With such a non-contact power supply system and a non-contact power supply device, the intensity of the interaction between the power receiving coil and each power supply coil is detected as interaction information by the plurality of interaction detection sections. Then, through the first and second processes of the coil control section, power supply coils that exhibit interaction with the power receiving coil, whether the interaction is stronger or weaker than the reference interaction, are selected as candidate excitation coils. That is, power supply coils that are arranged so that the coil surfaces are at least partially facing the coil surface of the power receiving coil and that are capable of supplying power to the power receiving coil are selected as candidate excitation coils. Then, the high-frequency voltage is supplied to the candidate excitation coils, thereby supplying power to the power receiving coil from the candidate excitation coils. As a result, it is possible to supply power to the power supply receiving device without accurately positioning the power supply coil and the power receiving coil with each other. Moreover, in the second process, power supply coils that are adjacent to the power supply coil corresponding to interaction information that indicates an interaction weaker than the reference interaction are selected as candidate excitation coils, and power is supplied from these adjacent power supply coils. Thus, if there is a positional misalignment between a power supply coil and the power receiving coil and the interaction is therefore weak, power is supplied to the power receiving coil from a plurality of power supply coils including those that are adjacent to the power supply coil. With a plurality of power supply coils, there is an increased amount of power supply to the power receiving coil, thereby reducing the possibility that the electric power to be supplied from the non-contact power supply device to the power supply receiving device decreases.

According to another embodiment, in the non-contact power supply system set forth above, the second process of the coil control section further includes not selecting, as the candidate excitation coil, a power supply coil corresponding to third interaction information, of the interaction information, that indicates a third interaction less than an interaction (inoperative interaction) predetermined as the second interaction weaker than the reference interaction.

With such a non-contact power supply system, power supply coils corresponding to interaction information that indicates a weak interaction less than the inoperative interaction are not designated as candidate excitation coils so that the high-frequency voltage is not supplied to the power supply coils. Therefore, for example, if the inoperative interaction is set to be greater than the very weak interaction caused by a foreign matter such as a piece of metal and weaker than the reference interaction, it is possible to reduce the possibility that such a foreign matter is heated.

According to another embodiment, in the non-contact power supply systems set forth above, the power supply receiving device further includes a presence notification section that starts operating by receiving a supply of electric power received by the power receiving coil and that transmits, to the non-contact power supply device, a presence notification indicating that the power receiving coil is placed facing the power supply coil. The non-contact power supply device includes a plurality of presence notification receiving sections, a determination section, a confirmation process section, and a power supply process section. The plurality of presence notification receiving sections are provided so as to correspond respectively to the plurality of power supply coils for receiving the presence notification. The determination section determines whether or not the presence notification has been received by any of the plurality of presence notification receiving sections during execution of the second process. If determination is made by the determination section that the presence notification has been received by any of the presence notification receiving sections, the confirmation process section performs a confirmation process of designating, as a confirmed excited coil, one of the candidate excitation coils that corresponds to the presence notification receiving section having received the presence notification. The power supply process section causes the power source section to supply the high-frequency voltage to the confirmed excited coil and causes the power source section to stop supplying the high-frequency voltage to candidate excitation coils other than the confirmed excited coil.

With the second process of the coil control section, since power supply coils that are adjacent to the power supply coil corresponding to interaction information that indicates an interaction weaker than the reference interaction are selected as candidate excitation coils, power supply coils that are not facing the power receiving coil may be included in the candidate excitation coils. With such a non-contact power supply system, one of the candidate excitation coils that corresponds to the presence notification receiving section determined by the determination section to have received the presence notification is designated as a confirmed excited coil by the confirmation process section. Then, the high-frequency voltage is supplied from the power source section to the confirmed excited coil. On the other hand, the presence notification receiving sections corresponding to those of the power supply coils selected as candidate excitation coils that are not facing the power receiving coil do not receive the presence notification. Then, a candidate excitation coil corresponding to a presence notification receiving section that does not receive the presence notification is not designated as a confirmed excited coil by the confirmation process section. Moreover, since the power supply process section causes the power source section to stop supplying the high-frequency voltage to candidate excitation coils other than the confirmed excited coil, the power supply is stopped for power supply coils that are not facing the power receiving coil. Thus, it is possible to stop the supply of the high-frequency voltage to those of power supply coils selected as candidate excitation coils that are not facing the power receiving coil.

According to another embodiment, in the non-contact power supply system set forth above, the presence notification includes identification information for identifying the power supply receiving device; the non-contact power supply device further includes a storage section in which identification information representing the power supply receiving device is pre-stored; and the confirmation process section performs the confirmation process if determination is made by the determination section that the presence notification has been received by any of the presence notification receiving sections and if the identification information included in the received presence notification is stored in the storage section.

With such a non-contact power supply system, the confirmation process of designating, as the confirmed excited coil, a power supply coil corresponding to the presence notification receiving section having received the presence notification is performed when the identification information included in the presence notification is stored in the storage section, i.e., when the power supply receiving device is a device that is allowed to receive power supply. Thus, the high-frequency voltage is supplied from the power source section to the power supply coil which is the confirmed excited coil. Therefore, it is possible to improve the reliability of supplying power from the power supply coil only to a power supply receiving device that is allowed to receive power supply.

According to another embodiment, in the non-contact power supply systems set forth above, the determination section determines whether or not the presence notification has been received by any of the presence notification receiving sections based on whether the presence notification has been received within a predetermined monitoring time since start of the second process.

With such a non-contact power supply system, it is determined by the determination section that a presence notification receiving section has not received a presence notification if the presence notification receiving section does not receive the presence notification within the monitoring time from a point in time when the presence notification section of the power supply receiving device becomes operable by the electric power received by the power receiving coil after the start of the second process. In such a case, a candidate excitation coil corresponding to a presence notification receiving section that is determined by the determination section to have not received the presence notification is considered to be not facing the power receiving coil.

According to another embodiment, in the non-contact power supply systems set forth above, the presence notification section gives the presence notification to the power supply device by changing an impedance of the power receiving coil; and each of the presence notification receiving sections receives, as the presence notification, a change in intensity of the interaction based on a change in impedance of the power receiving coil.

With such a non-contact power supply system, it is possible to give the presence notification to the power supply device by changing the impedance of the power receiving coil. Therefore, such a non-contact power supply system does not need to have a separate communication means for communicating with the power supply device for the purpose of giving the presence notification.

According to another embodiment, in the non-contact power supply systems set forth above, the presence notification section transmits the presence notification after passage of a predetermined start wait-time since start of the operation, and randomly changes the wait-time.

Where a plurality of power receiving coils (power supply receiving devices) are placed facing the power supply device, if presence notifications are transmitted simultaneously from the power supply receiving devices, the presence notifications may interfere with one another. If the presence notifications interfere with one another, the presence notifications will not be received properly by the presence notification receiving section. With such a non-contact power supply system, the presence notification section transmits the presence notification after passage of a predetermined start wait-time since the start of the operation, and randomly changes the wait time. Therefore, the timings with which the presence notifications are transmitted from the plurality of power supply devices vary randomly. As a result, such with a non-contact power supply system, it is possible to reduce the possibility that the presence notifications interfere with one another, and it is possible to reduce the possibility that presence notifications are not received properly by the presence notification receiving sections.

According to another embodiment, in the non-contact power supply systems set forth above, the presence notification section repeatedly transmits the presence notification at intervals of a predetermined repeat wait time, and randomly changes the repeat wait time; and if the presence notification has not been newly received within a predetermined setting time after the previous reception of the presence notification by the presence notification receiving section corresponding to the confirmed excited coil, the power supply process section causes the power source section to stop supplying the high-frequency voltage to the confirmed excited coil.

A power supply receiving device may be removed from the power supply device after being placed facing the power supply device. If the power supply receiving device is removed from the power supply device, the presence notification will not be received by the presence notification receiving section within the setting time. With such a non-contact power supply system, if the presence notification has not been newly received within the setting time after the previous reception of the presence notification by the presence notification receiving section corresponding to the confirmed excited coil, the power supply process section stops the supply of the high-frequency voltage to the confirmed excited coil. On the other hand, where a plurality of power supply receiving devices are placed facing the power supply device, if the plurality of power supply receiving devices repeatedly transmit the presence notifications with the same timing, the presence notifications will interfere with one another, and the presence notifications will not be received properly by the presence notification receiving sections. In view of this, the presence notification section randomly changes the repeat wait time at which the transmission of the presence notification is repeated. As a result, the timings with which the presence notifications are transmitted from the plurality of power supply devices vary randomly, it is possible to reduce the interference between the presence notifications, and it is possible to reduce the possibility that the presence notifications are not properly received by the presence notification receiving sections.

According to another embodiment, in the non-contact power supply systems set forth above, the plurality of interaction detection sections detect, as interaction information corresponding respectively to the power supply coils, current flows through the power supply coils while the high-frequency voltage is being supplied to the power supply coils by the power source sections.

The current flows through the power supply coils while the high-frequency voltage is being supplied to the power supply coils change depending on the intensity of the interaction between the power supply coils and the power receiving coil. Therefore, the plurality of interaction detection sections can detect, as interaction information corresponding respectively to the power supply coils, current flows through the power supply coils while the high-frequency voltage is being supplied to the power supply coils.

This application is based on Japanese Patent Application No. 2012-114402, filed on May 18, 2012, the content of which is herein incorporated by reference.

While the present invention has been appropriately and adequately described above by way of embodiments with reference to the drawings in order to illustrate the present invention, it should be recognized that changes and/or modifications to the above embodiments will readily occur to those skilled the art. Therefore, changed embodiments and modified embodiments carried out by those skilled the art are deemed to fall within the scope of the claims unless those embodiments are beyond the scope of the claims.

INDUSTRIAL APPLICABILITY

According to the present invention, it is possible to provide a non-contact power supply system, a non-contact power supply device, and a power supply receiving device.

The invention claimed is:
1. A non-contact power supply system comprising:
a non-contact power supply device for supplying electric power through an electromagnetic induction phenomenon; and
a power supply target device including a power receiving coil for receiving the electric power from the non-contact power supply device,
wherein the non-contact power supply device includes:
a plurality of power supply coils, for which the power receiving coil is to be placed facing the power supply coils;
a power source section for selectively supplying an excitation voltage to the plurality of power supply coils, the excitation voltage causing the power supply coils to generate a magnetic flux;
a plurality of interaction detection sections provided corresponding respectively to the plurality of power supply coils to detect, as interaction information corresponding respectively to the power supply coils, intensities of magnetic interactions between the power receiving coil and the power supply coils; and
a coil control section for performing a first process and a second process, with the first process being a process of selecting, as a candidate excitation coil, a power supply coil corresponding to first interaction information, of the interaction information, that indicates a first interaction stronger than a predetermined reference interaction, and causing the power source section to supply the excitation voltage to the candidate excitation coil, and the second process being a process of selecting, as candidate excitation coils, a power supply coil corresponding to second interaction information, of the interaction information, that indicates a second interaction weaker than the reference interaction and also selecting a power supply coil adjacent to the power supply coil, and causing the power source section to supply the excitation voltage to the candidate excitation coils,
the power supply target device further includes:
a presence notification section that starts operating by receiving a supply of electric power received by the power receiving coil and that transmits, to the non-contact power supply device, a presence notification indicating that the power receiving coil is placed facing the power supply coil; and
the non-contact power supply device further includes:
a plurality of presence notification receiving sections, provided so as to correspond respectively to the plurality or power supply coils, for receiving the presence notification;
a determination section for determining whether or not the presence notification has been received by any of the plurality of presence notification receiving sections during execution of the second process;
a confirmation process section that performs, when determination is made by the determination section that the presence notification has been received by any of the presence notification receiving sections, a confirmation process of designating, as a confirmed excited coil, one of the candidate excitation coils that corresponds to the presence notification receiving section having received the presence notification; and
a power supply process section that causes the power source section to supply the excitation voltage to the confirmed excited coil and causes the power source section to stop supplying the excitation voltage to candidate excitation coils other than the confirmed excited coil from among the candidate excitation coils.

2. The non-contact power supply system according to claim 1, wherein the second process of the coil control section further includes not selecting, as the candidate excitation coil, a power supply coil corresponding to third interaction information, of the interaction information, that indicates a third interaction less than an interaction predetermined as the second interaction weaker than the reference interaction.

3. The non-contact power supply system according to claim 1, wherein
the presence notification includes identification information for identifying the power supply target device;
the non-contact power supply device further includes a storage section in which identification information representing the power supply target device is pre-stored; and
the confirmation process section performs the confirmation process when determination is made by the determination section that the presence notification has been received by any of the presence notification receiving sections and when the identification information included in the received presence notification is stored in the storage section.

4. The non-contact power supply system according to claim 1, wherein the determination section determines whether or not the presence notification has been received by any of the presence notification receiving sections, based on whether the presence notification has been received within a predetermined monitoring time since start of the second process.

5. The non-contact power supply system according to claim 1, wherein
the presence notification section gives the presence notification to the power supply device by changing an impedance of the power receiving coil; and
each of the presence notification receiving sections receives, as the presence notification, a change in intensity of the interaction based on a change in impedance of the power receiving coil.

6. The non-contact power supply system according to claim 1, wherein the presence notification section transmits the presence notification after passage of a predetermined start wait-time since start of the operation, and randomly changes the wait time.

7. The non-contact power supply system according to claim 1, wherein
the presence notification section repeatedly transmits the presence notification at intervals of a predetermined repeat wait time, and randomly changes the repeat wait-time; and
when the presence notification has not been newly received within a predetermined setting time after the previous reception of the presence notification by the presence notification receiving section corresponding to the confirmed excited coil, the power supply process section causes the power source section to stop supplying the excitation voltage to the confirmed excited coil.

8. The non-contact power supply system according to claim 1, wherein the plurality of interaction detection sections detect, as interaction information corresponding respectively to the power supply coils, currents flowing through the power supply coils while the excitation voltage is being supplied to the power supply coils by the power source sections.

9. A non-contact power supply device for supplying electric power to a power supply target device including a power receiving coil receiving electric power through an electromagnetic induction phenomenon, and a presence notification section that starts operating by receiving a supply of electric power received by the power receiving coil and that transmits a presence notification indication indicating that the power receiving coil is placed facing the power supply coil,
the non-contact power supply device comprising:
a plurality of power supply coils, for which the power receiving coil is to be placed facing the power supply coils;
a power source section for selectively supplying an excitation voltage to the plurality of power supply coils, the excitation voltage causing the power supply coils to generate a magnetic flux;
a plurality of interaction detection sections provided correspondingly respectively to the plurality of power supply coils for detecting, as interaction information corresponding respectively to the power supply coils, intensities of magnetic interactions between the power receiving coil and the power supply coils;
a coil control section for performing a first process and a second process, with the first process being a process of selecting, as a candidate excitation coil, a power supply coil corresponding to first interaction information, of the interaction information, that indicates a first interaction stronger than a predetermined reference interaction, and causing the power source section to supply the excitation voltage to the candidate excitation coil, and the second process being a process of selecting, as candidate excitation coils, a power supply coil corresponding to second interaction information, of the interaction information, that indicates a second interaction weaker than the reference interaction and also selecting a power supply coil adjacent to the power supply coil, and causing the power source section to supply the excitation voltage to the candidate excitation coils;
a plurality of presence notification receiving sections, provided so as to correspond respectively to the plurality or power supply coils, for receiving the presence notification;
a determination section for determining whether or not the presence notification has been received by any of the plurality of presence notification receiving sections during execution of the second process;
a confirmation process section that performs, when determination is made by the determination section that the presence notification has been received by any of the presence notification receiving sections, a confirmation process of designating, as a confirmed excited coil, one of the candidate excitation coils that corresponds to the presence notification receiving section having received the presence notification; and
a power supply process section that causes the power source section to supply the excitation voltage to the confirmed excited coil and causes the power source section to stop supplying the excitation voltage to candidate excitation coils other than the confirmed excited coil from among the candidate excitation coils.

10. A power supply target device comprising a power receiving coil for receiving electric power through an electromagnetic induction phenomenon from the non-contact power supply device according to claim 9.

* * * * *